United States Patent
Belt et al.

(10) Patent No.: US 11,392,658 B2
(45) Date of Patent: Jul. 19, 2022

(54) METHODS AND SYSTEMS FOR WIRELESS ACQUISITION AND PRESENTATION OF LOCAL SPATIAL INFORMATION

(71) Applicant: Blind InSites, LLC, Plano, TX (US)

(72) Inventors: Darwin Wayne Belt, Plano, TX (US); Jessica B Hipp, Temple, NH (US); Jeffrey Hilton, Carrollton, TX (US); April Ryan Hilton, Carrollton, TX (US)

(73) Assignee: BLIND INSITES, LLC., Plano, TX (US)

( * ) Notice: Subject to any disclaimer, the term of this patent is extended or adjusted under 35 U.S.C. 154(b) by 0 days.

(21) Appl. No.: 16/783,938

(22) Filed: Feb. 6, 2020

(65) Prior Publication Data

US 2020/0265104 A1 Aug. 20, 2020

Related U.S. Application Data

(60) Provisional application No. 62/802,053, filed on Feb. 6, 2019.

(51) Int. Cl.
*G06F 16/9537* (2019.01)
*G06F 16/2455* (2019.01)
*H04W 4/90* (2018.01)
*H04W 4/021* (2018.01)
*G06F 16/9538* (2019.01)

(52) U.S. Cl.
CPC .... *G06F 16/9537* (2019.01); *G06F 16/24565* (2019.01); *G06F 16/9538* (2019.01); *H04W 4/021* (2013.01); *H04W 4/90* (2018.02)

(58) Field of Classification Search
CPC .......... G06F 16/9537; G06F 16/24565; G06F 16/9538; H04W 4/021; H04W 4/90
See application file for complete search history.

(56) References Cited

U.S. PATENT DOCUMENTS 6,522,875 B1 2/2003 Dowling et al.
7,039,522 B2 5/2006 Landau
(Continued)

OTHER PUBLICATIONS

Retrieved from the Internet: https://www.taylorfrancis.com/books/9781315222080 (via 'Preview PDF' link), 2006.
(Continued)

*Primary Examiner* — Kris E Mackes
(74) *Attorney, Agent, or Firm* — Caldwell Intellectual Property Law

(57) ABSTRACT

A system for wireless acquisition and presentation of local spatial information includes a portable computing device in communication with a wireless receiver, the portable computing device designed and configured to receive a first signal from a first transmitter at a first location, parse the first signal for at least a textual element, extract, from the at least a textual element, an identifier of the first transmitter, establish a spatial bounding constraint as a function of the identifier, retrieve regional descriptive data from a spatial information data structure as a function of the identifier, wherein the regional descriptive data describes information within the spatial bounding constraint, generate a local area description as a function of the regional descriptive data and the spatial bounding constraint, and present the local area description to a user of the portable computing device.

20 Claims, 4 Drawing Sheets

(56) References Cited

U.S. PATENT DOCUMENTS

| | | | |
|---|---|---|---|
| 7,525,425 B2 | 4/2009 | Diem | |
| 7,751,829 B2 | 7/2010 | Masuoka et al. | |
| 7,818,017 B2 | 10/2010 | Alizadeh-Shabdiz et al. | |
| 7,899,583 B2 | 3/2011 | Mendelson | |
| 8,254,953 B2 | 8/2012 | Mcbride et al. | |
| 8,417,258 B2 | 4/2013 | Barnes, Jr. | |
| 8,502,835 B1 | 8/2013 | Meehan | |
| 8,787,944 B2 | 7/2014 | Smith | |
| 9,202,245 B2* | 12/2015 | Kostka | H04W 88/08 |
| 9,648,581 B1* | 5/2017 | Vaynblat | G06Q 30/0261 |
| 10,126,132 B2 | 11/2018 | Belt et al. | |
| 10,185,921 B1* | 1/2019 | Heller | E05B 65/0035 |
| 10,212,555 B1* | 2/2019 | Rusu | G06F 16/9537 |
| 2004/0249679 A1* | 12/2004 | Henderson | G06Q 40/08 |
| | | | 705/4 |
| 2008/0252527 A1 | 10/2008 | Garcia | |
| 2016/0165425 A1* | 6/2016 | Diamond | H04M 1/72525 |
| | | | 455/404.2 |
| 2017/0249056 A1* | 8/2017 | Rainey | G06F 3/04842 |
| 2018/0075063 A1* | 3/2018 | Patel | G06F 16/29 |
| 2020/0168020 A1* | 5/2020 | Kennedy-Foster | G07C 9/257 |

OTHER PUBLICATIONS

Retrieved from the Internet: https://www.ncbi.nlm.nih.gov/pmc/articles/PMC6308471/pdf/sensors-18-04374.pdf, Dec. 11, 2018.
Retrieved from the Internet: https://arxiv.org/pdf/1709.01015.pdf, Jan. 16, 2019.

* cited by examiner

METHODS AND SYSTEMS FOR WIRELESS ACQUISITION AND PRESENTATION OF LOCAL SPATIAL INFORMATION

CROSS-REFERENCE TO RELATED APPLICATIONS

This application claims the benefit of priority of U.S. Provisional Patent Application Ser. No. 62/802,053, filed on Feb. 6, 2019, and titled "A METHODS AND SYSTEMS FOR WIRELESS ACQUISITION AND PRESENTATION OF LOCAL SPATIAL INFORMATION," which is incorporated by reference herein in its entirety.

FIELD OF THE INVENTION

The present invention generally relates to the field of localized wireless communication. In particular, the present invention is directed to methods and systems for wireless acquisition and presentation of local spatial information.

BACKGROUND

Use of wireless localized information for continues to suffer from various inadequacies. A lack of precision in transferred data can be particularly problematic where additional sources of information are compromised, and in emergent situations.

SUMMARY OF THE DISCLOSURE

In an aspect, a system for wireless acquisition and presentation of local spatial information, the system comprising a portable computing device coupled to a wireless receiver and configured to receive an identifier from at least a first transmitter at a first location, establish a spatial bounding constraint as a function of the identifier, retrieve regional descriptive data from a spatial information data structure as a function of the identifier, wherein the regional descriptive data describes information within the spatial bounding constraint, receive an element of circumstantial data, generate a local area description as a function of the regional descriptive data, the spatial bounding constraint, and an element of circumstantial data, and present the local area description to a user of the portable computing device.

In another aspect, a method of wireless acquisition and presentation of local spatial information includes receiving, by a portable computing device coupled to a wireless receiver, an identifier from at least a first transmitter at a first location. The method includes establishing, by the portable computing device, a spatial bounding constraint as a function of the identifier. The method includes retrieving, by the portable computing device, regional descriptive data from a spatial information data structure as a function of the identifier, wherein the regional descriptive data describes information within the spatial bounding constraint. The method includes generating, by the portable computing device, a local area description as a function of the regional descriptive data, the spatial bounding constraint, and an element of circumstantial data. The method includes presenting, by the portable computing device, the local area description to a user of the portable computing device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments of the disclosed systems and methods use local wireless communication to acquire information concerning a user's surroundings and provide the user with descriptions of those surroundings. Descriptions may be presented in audio or tactile form. In embodiments, a system may generate descriptions of local objects using data recording positions of such objects; data recording objects' positions may be updated based on one or more user inputs, on user-created or statistically generated schedules, or the like.

Figure 1:
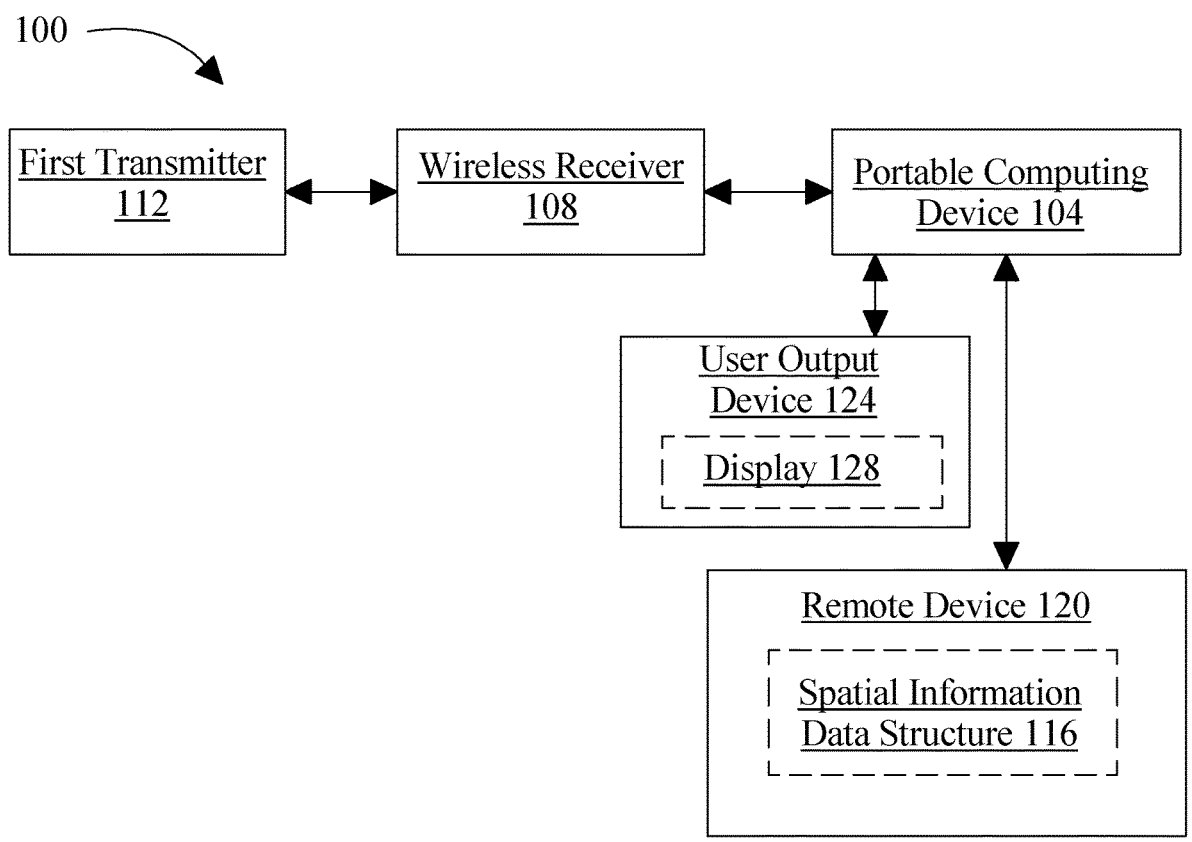
FIG. 1 is a block diagram illustrating an exemplary embodiment of a system for wireless acquisition and presentation of local spatial information.

Referring now to FIG. 1, an exemplary embodiment of a system 100 for wireless acquisition and presentation of local spatial information is illustrated. System 100 includes a portable computing device 104. Portable computing device 104 may be any computing device as described and defined below in reference to FIG. 4. Portable computing device 104 may be any computing device that may be carried on the person of a user. Portable computing device 104 may include, without limitation, a mobile device such as a mobile phone, smartphone, tablet, or personal digital assistant, or may be incorporated in a special-purpose device having features as described in further detail herein. Portable computing device 104 may include a single computing device operating independently, or may include two or more computing device operating in concert, in parallel, sequentially or the like; two or more computing devices may be included together in a single computing device or in two or more computing devices Portable computing device 104 may interface or communicate with one or more additional devices as described below in further detail via a network interface device. Network interface device may be utilized for connecting portable computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Portable computing device 104 may include but is not limited to, for example, a computing device or cluster of computing devices in a first location and a second computing device or cluster of computing devices in a second location Portable computing device 104 may include one or more computing devices dedicated to data storage, security, distribution of traffic for load balancing, and the like. Portable computing device 104 may distribute one or more computing tasks as described below across a plurality of computing devices of computing device, which may operate in parallel, in series, redundantly, or in any other manner used for distribution of tasks or memory between computing devices. Portable computing device 104 may be implemented using a "shared nothing" architecture in which data is cached at the worker, in an embodiment, this may enable scalability of system 100 and/or computing device.

Portable computing device 104 may be designed and/or configured to perform any method, method step, or sequence of method steps in any embodiment described in this disclosure, in any order and with any degree of repetition. For instance, portable computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Portable computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, portable computing device 104 may be in communication with a wireless receiver 108, where "in communication" signifies ability to send signals to, and receive signals from, wireless receiver 108, either directly or via an intermediate device. For instance, and without limitation, wireless receiver 108 may be incorporated in an additional portable computing device 104 such as a user mobile phone, smartphone, tablet, personal digital assistant, and/or any other computing device, portable computing device 104, receiver, or device as described anywhere in this disclosure, which may connect to portable computing device 104 via a network, which may be a local area network, a wide area network, the Internet, or any other network passing electronic wired and/or wireless communication between devices. Portable computing device 104 may be electronically coupled to wireless receiver 108, and/or in wireless communication with wireless receiver 108; portable computing device 104 may perform wireless communication with wireless receiver 108 using any suitable protocol, including without limitation BLUETOOTH protocols as described below.

Continuing to refer to FIG. 1, wireless receiver 108 may have an antenna. Wireless receiver 108 may include a wireless interrogator; in other words, the antenna may be capable of inducing a current in an antenna of a passive transmitter through magnetic coupling, capacitive coupling, or other means. Wireless receiver 108 may be able to receive the signal transmitted by one or more transmitters as described below using the antenna. In some embodiments, the wireless receiver 108 can transmit as well as receive signals. Wireless receiver 108 may include a transceiver, which both sends and receives signals; the transceiver may be a system on a chip, including processing, memory, or any other functions together in a single integrated circuit. Transceiver may exchange signals according to existing protocols, such as the BLUETOOTH protocol promulgated by Bluetooth SIG, Inc. of Kirkland, Wash. Transceiver may further implement a "beacon" protocol; as a non-limiting example, the beacon protocol may be implemented using the IBEACON protocol produced by Apple, Inc. of Cupertino, Calif., the EDDYSTONE protocol produced by Google, Inc. of Mountain View, Calif., or a similar protocol. Antenna may include a plurality of antennas; for example, and without limitation, antenna may include a first antenna that transmits interrogation signal, and a second antenna that receives return signal. Antenna may include multiple antennas that receive and/or transmit signals; for instance, antenna may include antennas facing in various directions for transmitting interrogation signals and receiving return signals to and from various directions simultaneously. Similarly, wireless receiver 108 may include both an antenna for receiving from and/or transmitting signals to a transmitter and a transceiver that may be used for communicating with a mobile computing device, for instance as described below. Wireless receiver 108 may include any device capable of or configured to receive any signal in the form of electromagnetic radiation, including without limitation visible spectrum light, infrared light, radio waves, or signals in any other portion of the electromagnetic spectrum, capacitive or magnetic inductance, or any other form of wireless communication that may be established between two electronic devices or components.

Still referring to FIG. 1, wireless receiver 108 may include a driver circuit. Driver circuit is an electric circuit, electrically coupled to antenna, that processes electric signals induced in antenna 112 by wireless signals and processes the electric signals. In other words, driver circuit may be any electrical circuit configured to wirelessly receive a signal from a transmitter, as described in further detail below, via antenna. Where wireless receiver 108 includes a wireless interrogator, driver circuit may further be configured to wirelessly transmit an interrogation signal via the antenna to a passive transponder; the interrogation signal may provide electrical power to the passive transponder. Driver circuit may further be configured to wirelessly receive a return signal from the transponder via the antenna.

With continued reference to FIG. 1, driver circuit may include analog components, digital components, or both. For instance, driver circuit may include one or more filters (not shown), such as a Butterworth filter, a Chebyshev filter, a band filter, or the like, to filter out noise or selectively receive particular frequencies or ranges of frequencies. Driver circuit may include one or more amplifiers. Driver circuit may include a logic circuit, or a circuit including at least one digital circuit element. Logic circuit may be hardwired; for instance, logic circuit may include logic hardware circuit components such as logic gates, multiplexors, demultiplexors, programmable circuits such as field-programmable arrays, read-only memory, and the like. Logic circuit may include memory, which may be any memory as described below in reference to FIG. 4. Logic circuit may include a computing device as described below in reference to FIG. 4. In some embodiments, the wireless receiver 108 includes a computing device; the computing device may be any computing device as described below in reference to FIG. 4. As a non-limiting example, the wireless receiver 108 may be a mobile computing device such as a mobile phone, "smartphone," or tablet; wireless receiver 108 may be incorporated in a mobile computing device. Wireless receiver 108 may be incorporated in a special-purpose device, such as handheld device or device mounted on a finding aid that, as a non-limiting example, is wirelessly or otherwise coupled to a mobile or portable computing device 104. Computing device may be a microcontroller.

Still referring to FIG. 1, wireless receiver 108 may include a power source. Power source may include a power storage device; the power storage device may include a battery. Power storage device may include a capacitor; for instance, the power storage device may include an ultra-capacitor. Power storage device may include a magnetic power storage device, such as a device that incorporates an inductor. In some embodiments, power source includes a photovoltaic device; the photovoltaic device may be any device that converts light to electric power. Power source may include power provided by an electrical network, for example including electric power accessed via a wall-plug; the electrical power may be alternating current "mains" power, or power generated by solar panels, wind turbines. Wireless receiver 108 may charge wirelessly; for instance, the wireless receiver 108 may charge inductively. Wireless receiver 108 may include an inertial power source that generates mechanical or electrical power from movement of wireless receiver 108, including without limitation an inertial power source that generates power from walking or swinging a cane on which inertial power source is mounted. Wireless receiver 108 may include an optical capture device, such as a camera, optical scanner, laser scanner, or the like.

With continued reference to FIG. 1, wireless receiver 108 is configured to receive a signal from at least a first transmitter 112. In some embodiments, where at least a first transmitter 112 includes a passive transmitter as described in further detail below, wireless receiver 108 may receive the signal by producing an interrogation signal using an interrogator, and receiving the signal generated by the passive transmitter in return. In other embodiments, where at least a first transmitter 112 includes an active transmitter as set forth in further detail below, wireless receiver 108 listens for the transmission frequency of at least a first transmitter 112 and inputs the signal upon receiving the signal output by at least a first transmitter 112. Wireless receiver 108 may exchange signals with at least a first transmitter 112; for instance, wireless receiver 108 may transmit a query to at least a first transmitter 112 and receive data in response to the query. Wireless receiver 108 may similarly receive a signal from a second transmitter or from additional transmitters situated in a navigable space 200, as described in further detail below. Wireless receiver 108 may be configured to receive content data from at least a first transmitter 112 or a second transmitter. Wireless receiver 108 may be configured to receive product data from at least a first transmitter 112 or a second transmitter.

Alternatively, or additionally, and still referring to FIG. 1, wireless receiver 108 may have a code reader. In some embodiments, a code reader may be any device capable of reading a visual code such as a UPC laser-scanned code or a quick read ("QR") code. In some embodiments, the code reader is a laser scanner. In other embodiments, the code reader is an optical device such as a camera; for instance, where wireless receiver 108 is a mobile device such as a mobile phone or tablet, or is coupled to such a device, the code reader may be the camera of the mobile device. The mobile device may be configured to input a QR or UPC code using the camera and then extract the data contained in the code using software. In any embodiment of methods, systems, and/or devices described herein in which wireless receiver 108 receives a return signal including a unique identifier and processes that return signal, wireless receiver 108 may similarly obtain the unique identifier by way of a code reader and process the unique identifier in a like manner.

With continued reference to FIG. 1, system 100 may include at least a first transmitter 112. At least a first transmitter 112 may include any device that outputs a signal using electromagnetic radiation; the signal may be sent using any frequency usable in communication, including without limitation radio waves, micro waves, infrared waves, and visible light. At least a first transmitter 112 may include an antenna. At least a first transmitter 112 may include a passive transmitter, such as those used for passive radio frequency identification ("RFID") or near field communication ("NFC") tags. In some embodiments, passive transmitter includes an antenna in which electric current is induced by magnetic coupling from an antenna, such as antenna of wireless receiver 108; the induced electric current may power the passive transmitter, which may use additional circuitry such as a logic circuit to analyze the signal and generate a response signal. Logic circuit may be any logic circuit as described above regarding driver circuit. At least a first transmitter 112 may output signal by modifying electromagnetic radiation using means other than an antenna. For instance, at least a first transmitter 112 may absorb and/or reflect ambient or directed electromagnetic radiation in visible or other spectra; first transmitter 112 may emit and/or reflect such electromagnetic radiation in spectrally altered pattern that may be detected using a code reader, antenna, or other device or component of wireless receiver 108. This may be accomplished, in a non-limiting example, using one or more pigments disposed on a surface of first transmitter 112; one or more pigments may include, as a non-limiting example, two or more contrasting pigments, which may be provided in a one-dimensional or two-dimensional distribution. Non-limiting examples of such pigmented arrangements may include quick-read codes and/or universal product codes, as rendered on physical objects, electronic displays, and the like.

Still referring to FIG. 1, response signal may be output by the same antenna. The response signal may be output by an additional antenna; in other words, as described above for wireless transmitter, antenna may include multiple antennas. In some embodiments, the passive transmitter has a plurality of antennas to enable the transmitter to capture the signal optimally from a plurality of angles. The signal from the interrogator may contain no information, functioning solely to activate the passive transmitter. In other embodiments, the signal from the interrogator contains information that circuitry in the passive transmitter processes.

Continuing to refer to FIG. 1, at least a transmitter may include an active transmitter. Active transmitter may be a transmitter having a power source other than an interrogation signal; power source may be any power source as described above. Active transmitter may use the antenna to broadcast a signal periodically. Active transmitter may use the antenna to listen for incoming signals and transmit in response to a detected signal. Active transmitter may perform both actions; for instance, active transmitter may periodically transmit a first signal, and also transmit one or more second signals in response to signals at least a transmitter receives. At least a transmitter may include a transceiver, which may be any transceiver as described above. At least a transmitter may include a beacon using any beacon protocol as described above.

Still referring to FIG. 1, at least a transmitter may include a memory. Memory may be any memory as described below in reference to FIG. 4. In some embodiments, memory is read-only. In other embodiments, memory may be writable. The writable memory may require authentication; for instance, the writable memory may be writable only given a password, identifier, key, or other data indicating that the device that will be modifying the memory is authorized. Memory may include any combination of the above; for instance, memory may include a read-only section. Memory may include a writable section with limited access. Memory may include a writable section with general access, to which any user may be able to write data. Memory may include the read-only section and the generally writable section, or the limited access writable section and the generally writable section, or the read-only section and the limited access section. The limited access section may be limited to users of the system 100, or in other words may be generally writable, but only to users of the system 100, who may have the requisite access codes as a result of joining the system 100 as users; the users may alternatively be granted the access codes by the system 100 to update information on at least a transmitter only when authorized by the system, and otherwise be unable to update the memory; in this way, the system 100 may be able to update information on at least a transmitter memory efficiently by way of the receiver while maintaining security against misuse of the memory. In some embodiments, preventing users from being able to write over memory enables the memory to be free from intentional or unintentional corruption or inaccuracy, and enables the system 100 to ensure that certain information is always available to users of at least a transmitter. In some embodiments, writable sections enable the system 100 itself or users of the system 100 to correct, augment, or update information as described in further detail below.

Continuing to refer to FIG. 1, at least a first transmitter 112 is configured to transmit a signal. Signal may be a return signal in response to a prompt by another wireless communication device, including without limitation wireless receiver 108. Signal may be a return signal in response to interrogation by an interrogator included in another wireless communication device, including without limitation wireless receiver 108. Signal may be any wirelessly transmitted signal, including without limitation any signal transmitted through electromagnetic radiation, magnetic coupling, capacitive or other electronic coupling, or any other wireless means. Signal may include an identifier; identifier may identify at least a first transmitter 112, a feature, including without limitation a user feature 212 as defined below, adjacent to or attached to at least a first transmitter 112, or a feature, including without limitation a user feature 212, otherwise associated with at least a first transmitter 112. At least a first transmitter 112 may identify a specific location; specific location may include, without limitation, a location to which at least a first transmitter 112 is attached or affixed. Specific location may be static; other features may be associated with specific location. For example, a transmitter of at least a first transmitter 112 may identify a specific location on a specific shelf in a store; products can be switched out at that location and a reference to a database, which may include any data structure as described in this disclosure, may identify which product is then stored at that location. Movement of products in the above example may be predicted or tracked according to any method or method steps for prediction and/or tracking of elements within a space to be described, as set forth in further detail elsewhere in this disclosure. As an additional non-limiting example, at least a first transmitter 112 may include a set of transmitters adjacent to or attached to a user feature 212, defining a path to a user feature 212 through a navigable space 200 as defined in further detail below, or the like, and all sharing the same unique identifier that is unique to the user feature 212; alternatively, each transmitter of at least a first transmitter 112 may have a unique identifier of its own. Identifier may take the form of a unique identifier that uniquely corresponds to at least a first transmitter 112 for the purposes of the system 100; this may be accomplished using methods including but not limited to Globally Unique Identifiers (GUIDs), Universally Unique Identifiers (UUIDs), which may be identifiers including numbers generated according to a standard which makes the chances of another UUID or GUID being identical to the instant identifiers negligible to the point of near-certain impossibility, or by maintaining a data structure, table, or database listing all transmitter identifiers and checking the data structure, table listing, or database to ensure that a new identifier is not a duplicate. Identifier may alternatively identify a group of transmitters including or included in at least a first transmitter 112. Group of transmitters may be commonly owned; for instance, group of transmitters may all be owned by a single person or entity. Owner of a transmitter and/or group of transmitters may have exclusive ability to modify information publicly associated with transmitters, where information publicly associated with transmitters includes information linked to identifier in any data structure as set forth in further detail below, or stored and transmitted by the transmitter, and available to all users of portable computing devices like portable computing device 104. Alternatively or additionally, rights to change publicly available information may be possessed by individuals and/or groups having particular authentication credentials or the like. Information on data structures as described herein may be organized according to owner identifiers and/or identifiers of groups of transmitters; in an embodiment, this manner of organization may make retrieval of data from data structures more efficient. For instance, and without limitation, owner identifier may be linked in a data structure or table to a location or identifier of a data structure and/or database relating to that owner identifier. As a further example, a single server or remote device, as described in further detail below, may include all information and/or data structure portions or instances pertaining to a particular owner identifier. As a non-limiting example one or more transmitters of at least a first transmitter 112 may be formatted owner identifiers in the textual element prior to provision of the one or more transmitters to the owner; alternatively or additionally a mechanism may be provided in an application or the like allowing an owner to format his or her own tags with the textual element identifying him or her as the owner. Signal may include other data in addition to identifier.

With continued reference to FIG. 1, data to be transmitted by at least a first transmitter 112 may be stored on at least a first transmitter 112 in any format conducive to its storage and transmission. Data may be stored in binary form; the binary storage may be any encoding of information. Data may be organized into formats such as network packets, fixed-length strings, XML, or any other form. Persons skilled in the art, upon reading the entirety of this disclosure, will be aware of many different ways in which data may be stored on at least a first transmitter 112 and/or portable computing device 104.

Still referring to FIG. 1, portable computing device 104 may be designed and configured to parse a signal received from at least a first transmitter 112 for at least a textual element. Portable computing device 104 may be designed and configured to receive first signal from at least a first transmitter 112; receiving a signal from a transmitter, as described herein, may include receiving signal via receiver, as communicatively connected to portable computing device 104 as described above. For instance, a receiver connected directly, wirelessly, or via an network to portable computing device 104 may receive a signal from a transmitter via passively or actively scanning transmitter, and then relay that signal to the portable computing device 104; e.g., a first user may scan or otherwise receive a signal from a transmitter using a first portable computing device 104, such as a smartphone, which may then transmit the signal, or a message based on the signal, to portable computing device 104. At least a textual element may include any datum or data that may be rendered as text, including without limitation numerical text, as any character or string of characters in any written language, as any punctuation, diacritical symbols, or other markings associated with any form of written text, and the like. Textual data may include the unique identifier.

Still referring to FIG. 1, embodiments of methods and/or systems described in this disclosure may use or manipulate spatial bounding constraints. A spatial bounding constraint, as used herein, is a limitation on data having spatial characteristics as a function of one or more localizing spatial parameters. For instance, a spatial bounding constraint may limit data used for generation or presentation of a local area description and/or retrieved or stored regarding regional descriptive data, as described in further detail below, data pertaining to locations within a certain geometrically and/or geographically defined area or volume. For instance, and without limitation, a spatial bounding constraint may include a geometrically and/or geographically defined region around a root location. A "root location" as used herein is a point in space by reference to which distances and regions are defined; root location may be selected arbitrarily, or according to any suitable method. For instance, and without limitation, a location of at least a first transmitter 112 may be selected as root location.

Continuing to refer to FIG. 1, a location of a user of portable computing device 104 and/or system 100 may be selected as root location. A location of a feature such as an architectural feature 208 or user feature 212 as described in further detail below may be selected as root location. Root location may be chosen as a location of a point of interest, such as a lookout spot, a monument, a geometric and/or geographical center within a navigable space 200 as described below, a sign, a placard, a distinctive feature of landscape, architecture, or vegetation, or any other suitable point. Root location may be chosen as a function of a user instruction; user instruction may identify a desired root location either implicitly or explicitly, such as by requesting information "around me" or concerning an object known to the user and with regard to which the user may wish for information, such as a lookout point or monument. Root location may be indirectly chosen by user by entry of data indicating that user wishes to engage in a particular activity; for instance, a user may enter information indicating interest in a panoramic view of an area, which request may be mapped in a data structure or the like to establishment of a lookout point as root location. Similarly, user interest in historical information may be mapped to selection of a particularly historically significant element near to the user, such as a monument, as root location. Root location may alternatively or additionally be selected automatically based on past interactions with a current user or with one or more other users; for instance, where a majority or other statistically significant fraction of all users located near a particular monument or view tend to select the monument or view as root location, that monument or view may be selected as a default which may be changed by user or the like. A location selected by a current user on a past occasion may similarly be stored and selected as default root location at a current time. In an embodiment, default root location may be selected based on a single use to which a given area or navigable space 200 is typically put; for instance, a rest stop having nothing but a parking lot and a lookout spot may have the lookout spot recorded in a data structure or the like as default root location. Root location may be chosen by default as a "main feature" of an area or navigable space 200; for example, and without limitation, a room or other space that has a main purpose may be described in especial detail around that item.

Still referring to FIG. 1, a spatial bounding constraint may include a geometrically defined region around a root location. Geometrically defined region may include any regular or irregular polygonal and/or curved figure centered geometrically about root location, including an area about root location defined by a radius; geometrically defined region may include any form of volume or area about root location, including areas not centered about root location, such as areas in which root location is on one side or the other, at an entrance or exit, or the like. In an embodiment, a spatial bounding constraint may include an object-density function of distance from root location; an object-density function may vary the degree to which objects are described according to distance from root location, such as describing objects in more detail near to root location, and in decreased detail as a function of distance; decrease may be according to any suitable function, including linear, polynomial, exponential, Gaussian, or other decreases. Geometrical area and object density function may be combined: for instance, object density function may be applied to describe objects within a geometrically and/or geographically defined region, outside of which nothing is described. Object-density function may also be modified according to one or more measures of importance of objects. Importance may be globally determined; for instance, where a user is located at a lookout spot, a mountain that is a part of the view may be recorded as having higher importance, causing it to be more likely to be described than other objects similarly distanced from the lookout spot. Importance may be user-specific; for instance, user may enter data indicating objects of interest to the user, categories of interest to the user, or the like. User-specific objects or categories may be based on user history, such as previous user selections of or instructions concerning objects of interest. User-specific importance of an object to a user may depend on a user need; for instance, where user is visually impaired, objects aiding in navigation for visually impaired persons may be given greater importance so that user can rely on them in deciding how to cross a room or other space. Similarly, where a user is mobility-impaired, objects affecting ability of the user to move through an area, including obstacles and/or aids such as handrails, may be assigned higher importance. User needs may be recorded in memory of portable computing device 104 and/or in one or more data structures as described in further detail below. Importance of objects may be assigned based on an intended user action; for instance, where user enters on portable computing device 104 an instruction that user wishes to perform an action that involves a particular category of objects, objects belonging to that category may be assigned a greater degree of importance. As a non-limiting example, if a user enters an instruction indicating an interest in washing his or her hands, objects such as sinks, soap dispensers, hand dryers, and the like may be given higher importance, such that they are described at a greater distance. High-importance objects may be excepted from object-density function; that is, an object above a threshold level of importance, selected as important, or belonging to an important category, may be described to a user without reference to the object-density function to determine whether the object should be so described.

Figure 2:
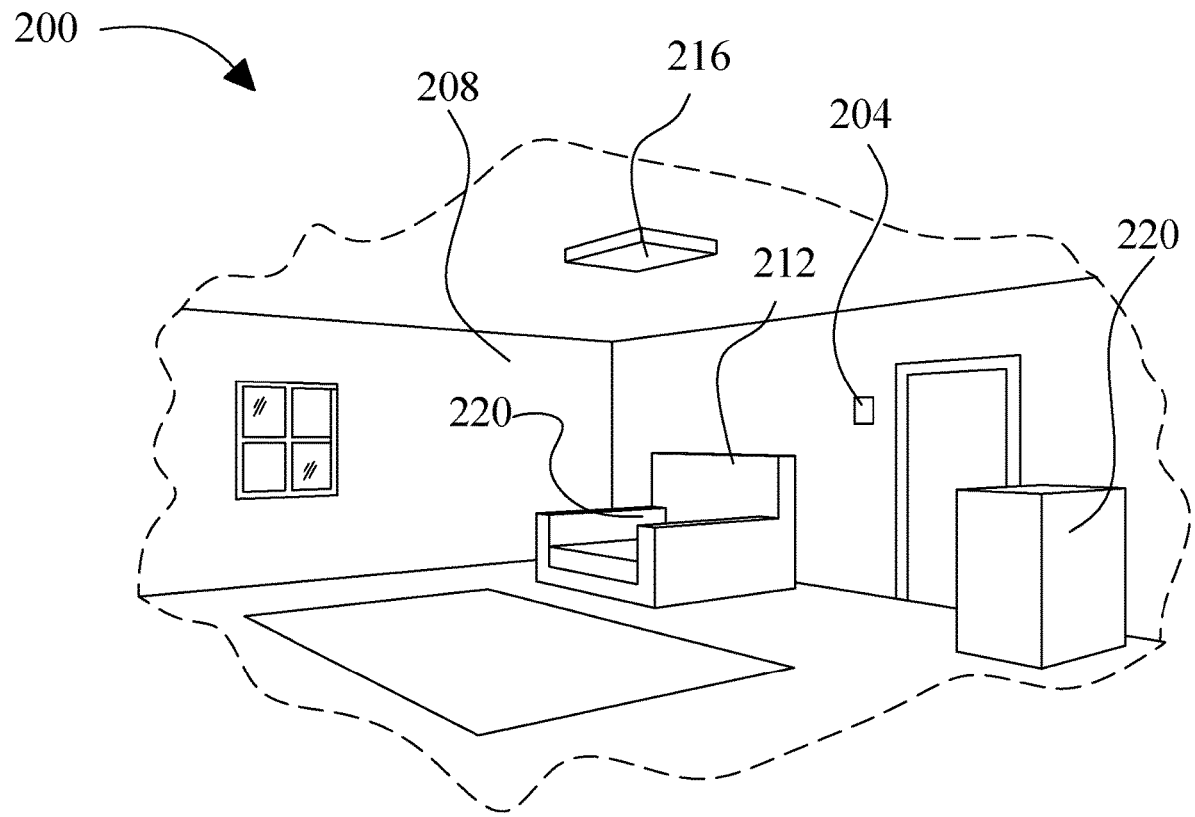
FIG. 2 is a schematic diagram illustrating an exemplary embodiment of a navigable space.

A spatial bounding constraint may include a navigable space 200. Referring now to FIG. 2, an exemplary embodiment of a navigable space 200 is illustrated. At least a first transmitter 112 may be located at a location in a navigable space 200. Navigable space 200 may be any space a user may wish to negotiate, including any outdoor or indoor space. Navigable space 200 may include without limitation a corridor, a room, an interior or exterior retail space, a restaurant dining area, a restroom, a trail, a parking lot, a road, a sidewalk, a park, or a vehicle such as a bus, train, aircraft, boat, ship, space vehicle, or space station. A navigable space 200 may contain other navigable spaces 200; as a non-limiting example, first navigable space 200 may be a restaurant, within which a bathroom may be a second navigable space 200 and a dining area may be a third navigable space 200. Further continuing the example, a toilet stall within the bathroom may be a fourth navigable space 200.

Continuing to refer to FIG. 2, navigable space 200 may contain architectural features 208, which may be features of the construction of navigable space 200 that serve purposes not directly related to user interaction, such as baseboards, walls, ceilings, molding, floors, floor tiles, and the like. Navigable space 200 may contain at least a user feature 212, which may be at least an object located in navigable space 200 for the purpose of user interaction; for instance, user features 212 may include without limitation sinks, toilets, toilet stalls, urinals, paper towel dispensers, hand driers, trash cans, automatic teller dispensers, doors, elevators, vending machines, fountain drink dispensers, ticket taking/dispensing devices, salad bars, or any other items a user would expect to interact with when using navigable space 200. A user feature 212 may include a free-standing device. Additional features may include other items such as without limitation, books, art, decorations, floor coverings, wall coverings, and the like.

Still referring to FIG. 2, objects described or referred to according to systems and/or methods disclosed herein may include at least a fixed object 216. At least a fixed object 216 may include an object that is ordinarily incapable of changing its position or being moved to a different position. At least a fixed object 216 may include an architectural feature 208 such as a wall, ceiling, floor, doorframe, baseboard, staircase, or the like. At least a fixed object 216 may include objects such as buildings, trees, mountains, sidewalk curbs, street signs, or the like. In an embodiment, at least a fixed object 216 may be moved, displaced, or destroyed; for instance, a wall may be knocked down, a stair case dismantled, or a sign or tree uprooted. However, movement, displacement, and/or destruction of a fixed object 216 may be an unusual event. Embodiments of system 100 may operate under the assumption that at least a fixed object 216 is an object that remains where previously described or detected, absent a user input or other data-gathering input indicating destruction, movement, or removal of at least a fixed object 216.

Continuing to refer to FIG. 2, objects described or referred to according to systems and/or methods disclosed herein may include at least a movable object 220. At least a movable object 220 may include any object that can be moved from one location to another during the normal course of its operation or use; for instance, chairs that are not fixed to the floor, freestanding lamps, doors, and sliding windows may all be movable objects 220. A movable object 220 may be a constrained movable object 220, or an object whose movement is limited to a particular range or direction of motion; for instance a door on hinges may be a constrained movable object 220 because it is ordinarily only able to pivot on the hinges, and cannot be slid, moved away from a doorframe. Similarly, a window may be slidable between open and closed positions but otherwise may not be movable. A further example of a constrained movable object 220 may include a retractable divider that may be extended across a room to divide the room or folded or otherwise stowed against or within a wall to allow undivided use of the room. A movable object 220 may be unconstrained; for instance, an item of furniture such as a chair or couch may be moved and/or turned in any direction, absent barrier.

Still referring to FIG. 2, a location 204 of at least a first transmitter 112 may include a location 204 in or on an architectural feature 208 of navigable space 200; for instance, at least a first transmitter 112 may have a location 204 in a baseboard within a room, corridor, or other space. At least a first transmitter 112 may have a location 204 within molding. At least a first transmitter 112 may have a location 204 within a wall, or within a recess in the surface of a wall. At least a first transmitter 112 may have a location 204 mounted on a wall; for instance, location 204 may be a wall-mounting, such as a wall-mounted box or sign (e.g., a building directory or an Americans with Disabilities Act ("ADA") sign), for instance as described in further detail below. Location 204 may be adjacent to a user feature 212. For instance, location 204 may be located adjacent to a sink. In some embodiments, location 204 near to a user feature 212 allows the user or the system 100 to determine location 204 of the user feature 212. In some embodiments, location 204 is a location at a user feature 212 of navigable space 200; for instance, at least a first transmitter 112 may be attached to the user feature 212. At least a first transmitter 112 may be incorporated in the user feature 212.

With continued reference to FIG. 2, location 204 may be fixed. A location may be fixed if it does not change position during typical use of navigable space 200. For instance, if location 204 is within a fixture in navigable space 200, location 204 may be unlikely to change position. Likewise, if location 204 is incorporated or attached to a trash can, although the trash can may be moveable, it may be likely to remain in more or less the same part of a space during typical use; for instance, the trash can in some bathrooms is more or less invariably located beneath or beside a paper-towel dispenser. Further examples of fixed location 204 include, without limitation, a baseboard at a wall corner such as a corner at intersecting corridors, the front or bottom edge of a countertop such as the front or bottom edge of a countertop in front of a user feature 212, on a wall at the end of a countertop, on the face of or underneath a countertop at a sink, at the back of a stall at door or eye level, at the back of a stall door away from the toilet, and the bottom corner of a door (for instance at the strike or handle side); the door used for location 204 may be an entrance or exit door. In some embodiments, where location 204 is fixed, the position of the fixed location within navigable space 200 may be used to determine the position, orientation, or both of the user within navigable space 200, as set forth in further detail below.

Still referring to FIG. 2, at least a first transmitter 112 may alternatively or additionally be located in a non-fixed location. The non-fixed location 204 may be a location that is not necessarily predictable or affixed to a feature of navigable space 200; the non-fixed location may nevertheless be likely to be within navigable space 200. For instance, the non-fixed location may be in a trash can, a recycled paper or aluminum container, on a menu, or on a mop or other piece of equipment intended for use in navigable space 200.

In an embodiment, and still referring to FIG. 2, system 100 may include a surface feature indicating location 204 of at least a first transmitter 112. Surface feature may be a projection such as a "bump". Surface feature may be an indentation. Surface feature may include a sign such as an ADA sign or building directory. Surface feature may be a region of the surface having a different texture from the surrounding surface. As a non-limiting example, where at least a transmitter is located in a baseboard, surface feature may be a projection or indentation that a user is able to detect with the tip of a white cane as described in further detail below; in some embodiments, where wireless receiver 108 is only able to detect at least a first transmitter 112 at short range, the user may locate the surface feature to place the receiver in communication with at least a first transmitter 112. Alternatively or additionally, surface feature may be positioned or formed to be readily located using a user's hand. For instance, the surface feature may be located on a countertop, sign, or other item located within the reach of a user during navigation or use of navigable space 200. The surface feature may have a specific shape, such as a raised 3-dimensional product logo or the like to identify location 204 of the transmitter and distinguish it from other random "bumps". The surface feature may also have a form recognizable to the user, such as a message in braille or a "bump dot" such as those often used by visually impaired persons to mark locations of important items. Location 204 of at least a first transmitter 112 may alternatively or additionally be located at a consistent or predictable spot within navigable space 200, such as at a corner, at a doorjamb on a particular side of a door, or on or near a sign; transmitters may be placed beside or below an ADA sign near the left or right side of the sign. A side a transmitter is placed on relative to the sign may indicate which direction from the sign the door or entrance being described is located. Location 204 may be at a consistent location within a sign such as the top center or the right end of a line of braille. Thus, a user utilizing the system 100 may locate at least a transmitter by searching for either a surface feature or for a known or predictable location within navigable space 200.

This may aid the user or the system 100 or both in finding location and orientation of the user within navigable space 200.

Referring again to FIG. 1, portable computing device 104 may receive and/or process one or more elements of regional descriptive data. Regional descriptive data as used herein is any data describing and/or pertaining to objects within spatial bounding constraint. For instance, and without limitation, regional descriptive data may include feature data. Feature data may be data describing a feature, such as an architectural feature 208 or a user feature 212 as defined above. Feature data may include the height location of features; in other words, regional descriptive data may indicate the vertical position of features or portions thereof. Regional descriptive data may include the orientation of features. Feature data may include user feature 212 data. User feature 212 data is defined herein as any data describing user feature 212 or portions or contents thereof. Data pertaining to user feature 212 may include history of user feature, 212 such as when it was last cleaned or serviced and by who, with associated contact information, or the like. Data pertaining to user feature 212 may include directions for use or operation/maintenance, replacement parts, etc. (dosage for adults, children, etc.), maximum number of doses during a timeframe, or the like. Data pertaining to user feature 212 may include links to websites for more detailed information such as a manufacturer website showing videos how to use, assemble, or the like User feature 212 data may include a feature type; for instance, the user feature 212 data may indicate whether a particular feature is a urinal, toilet, vending machine, elevator, or the like. User feature 212 data may indicate the number of user features 212 of a given type. User feature 212 data may include state information concerning at least one feature of the navigable space 200. State information may be information that describes the current state of a user feature 212; state information may include without limitation, information indicating that feature is under recall, needs service or is out of date. State information may indicate whether the user feature 212 is functioning. State information may indicate whether the user feature 212 is off or on; for instance, state information may indicate if water is flowing from a faucet, or a toilet has just been flushed. User feature 212 data may include safety information, which may be any information related to the feature concerning matters that could affect user safety or security. As a non-limiting example, safety information may include information indicating that a microwave or stove is in use, that the floor is or may be wet, that a surface is slippery or presents a tripping hazard, that there is high voltage at or near the user feature 212, that there are currently moving vehicles nearby, or that a travel location for moving vehicles is nearby, interactions with other products such as drug interactions in pharmaceutical products, warnings if the user has certain conditions (e.g. high blood pressure), and the like. Safety information may indicate the orientation relative to user feature 212 of hazards. Safety information may include instructions for avoiding hazards while using user feature 212. Safety information may overlap with state information; for example, whether a walk light is on or whether a stove or microwave oven is currently operational may be both state information and safety information. User feature 212 data may include content data. Content data may be information indicating contents or components of user feature 212, such as ingredients of edible contents of a container or dispenser of food or drink, money contained in an ATM, and the like.

Continuing to refer to FIG. 1, regional descriptive data may include the space type of a navigable space 200; in other words, regional descriptive data may indicate whether navigable space 200 is a restroom, elevator lobby, or other type of space. Space types may include, as further non-limiting examples, business type (e.g. retail: dress shop, restaurant, toy store, automotive parts, etc.) and/or a type of services (e.g. dentist, insurance company, bank, auto repair). Regional descriptive data may include space entry or exit location s, numbers and types; types may include, for instance, whether the exit or entrance is handicap accessible, whether it is a front door, a location of a nearest exit, a location of an exit to a parking garage or specific street or level, and the like. Regional descriptive data may indicate whether the transmitter is on a fixed or non-fixed item. Regional descriptive data may indicate special navigational data concerning a particular item, such as whether an elevator is an express elevator that only goes to upper floors, or whether an escalator is currently running upward or downward. Regional descriptive data may include information about a numbering or order of rooms or other spaces or features; for instance, wayfinding information may indicate whether to the left of the room in which the user is currently located are higher or lower number rooms. Regional descriptive data may provide information concerning occupants and/or room numbers as presented in an office directory in a building lobby.

Still referring to FIG. 1, regional descriptive data may describe one or more visual features of one or more objects. Visual features may include without limitation colors, degree of specular reflection, apparent textures, material composition of visible surfaces, degrees of aging, shapes, sizes, orientations, artistic and/or architectural styles, and the like. Regional descriptive data may include factual or historical information; for instance, regional descriptive data pertaining to a monument or other historically relevant object or location may describe historical facts and/or narratives concerning the object or location. As a further example, regional descriptive data may describe biological, scientific, and/or engineering facts concerning objects; as a non-limiting example regional descriptive data concerning a stand of trees might describe ways in which tree roots interlock, enabling tall trees to be supported by relatively shallow root systems. Regional descriptive data may describe biographical information, such as without limitation a biography of an artist that produced a work of art being described. Regional descriptive data may describe a function or purpose of an object being described.

Continuing to refer to FIG. 1, portable computing device 104 may be configured to retrieve regional descriptive data from a spatial information data structure 116 as a function of an identifier received from at least a first transmitter 112. Data structure 116 may be hosted or stored on one or more remote devices 120, which may include any computing devices as described below in reference to FIG. 4, and which may communicate with portable computing device 104 and/or other computing device or portable computing devices over a network such as the Internet or a local area network. Spatial information data structure 116 may be wholly or partially installed on portable computing device 104; for instance, portable computing device 104 may load a portion of spatial information data structure 116 relevant to a location at which portable computing device 104 is currently located, enabling portable computing device to access that portion of spatial information data structure 116 where there is limited network connectivity.

Spatial information data structure 116 may include any data structure or combination of data structures, where a data structured is defined as a standardized ordering of data according to particular categories. Categories may include, without limitation, categories of historical nature; for example, architectural features common to a specific time period or designed by an individual or group of individuals may be included in categories. Categories may include artistic period data pertaining, for instance, to artworks in a museum. This ordering of data may be accomplished by any suitable means, including by organization within relational databases, organization using object-oriented programming, organization into particular files, tables, or other data stores, and the like. For instance, regional descriptive data used by the system 100 may include the identification of particular navigable spaces 200; the regional descriptive data corresponding to each navigable space 200 may be organized together so that accessing the identity of a particular navigable space 200 enables the system 100 to retrieve information about the contents, layout, and use of navigable space 200. As a non-limiting example, each navigable space 200 may correspond to an object or structure within object-oriented programming, with the object contents organized according to different elements of navigable space 200; thus, architectural features 208 included in navigable space 200 may be included in an element of the object corresponding to navigable space 200 and may be organized according to any suitable organization style, including in hierarchical or non-hierarchical data structures. Architectural features 208 may be further organized into categories, such as walls, doors, toilet stalls, tables, and corridors. Continuing the example, user features 212 included in navigable space 200 may be similarly included in elements of the object corresponding to navigable space 200. Navigable spaces 200 within navigable space 200 may have corresponding elements within the object pertaining to navigable space 200. Navigable spaces 200 may, as a non-limiting example, be stored in a tree structure so that physical navigation of the spaces or plotting of paths traversing navigable spaces 200 to nearby or included navigable spaces 200 corresponds to the traversal of the tree structure.

Still referring to FIG. 1, spatial information data structure 116 may include or link to a map. Map may be an electronic or virtual map. Virtual map may contain the dimensions of at least a navigable space 200. Virtual map may contain location of at least a first transmitter 112 within a navigable space 200. Virtual map may contain location of a second transmitter within a navigable space 200. Virtual map may contain locations of architectural features 208 within the navigable space 200. Virtual map may contain locations of user features 212 within the navigable space 200.

With continued reference to FIG. 1, virtual map may include one or more coordinate systems to aid in orientation and location detection and route calculation. The coordinate system may include a Global Coordinate System (GCS); in some embodiments, the GCS is a coordinate system orienting and locating navigable space 200, users, and features to a global set of axes. The global axes may be directional axes used to navigate the surface of the Earth, such as latitude and longitude. For example, a first global axis, which may be labeled the Y axis, may be oriented north-south, with north being the direction of the positive Y axis and south the direction of the negative Y axis. Likewise, a second axis, which may be the X axis, may be oriented east-west, with east in the direction of the positive X axis and west in the direction of the negative X axis. Up and down may correspond to a third axis, which may be the Z axis, with up positive for the Z axis and down negative for the Z axis.

Still referring to FIG. 1, in some embodiments, coordinates may include a User Coordinate System (UCS) for each navigable space 200. The UCS for a given navigable space 200 may have an origin point at a fixed location within the navigable space 200; for instance the origin point may be located at the strike or handle side of the entrance door of a room or other space. The UCS may have three axes that span three dimensions. As a non-limiting example, a first axis, which may be the Y axis of the UCS, may be oriented in a first horizontal direction. In some embodiments, the first horizontal direction is a direction that is relatively simple to determine from location of the origin and the physical characteristics of the surrounding features; for instance, where the origin is located at a door in the navigable space 200 or at a wall of the navigable space 200, the Y axis may be perpendicular to the door or wall. The direction along the Y axis projecting into the navigable space 200 may be positive. Further continuing the example, the UCS may include a second axis, which may be the X axis, in a second horizontal direction such that the Y and X axes together span the horizontal plane; the X axis may be perpendicular to the Y axis. The X axis may be aligned in a direction determinable by the physical characteristics of the features near the origin of the UCS; for instance, where the Y axis is perpendicular to a wall or door, the X axis may be parallel to the wall or door. The UCS may include a third axis, which may be the Z axis, such that the Y, X, and Z axes together span three dimensions; the Z axis may be perpendicular to the Y and X axes, and thus vertical. In some embodiments, up is in the positive direction on the Z axis. Each UCS may have a specific relationship to the GCS that can be transposed when appropriate.

Continuing to refer to FIG. 1, in some embodiments, where one of at least a first transmitter 112 has a fixed location, at least a first transmitter 112 with the fixed location has its own UCS. The transmitter location may be the UCS origin. The UCS axes may be selected as described above. For instance, perpendicular to and into the face of the (wall mounted or feature mounted) fixed transmitter may be a positive Y axis communicated to the user as "straight ahead". A positive X axis may be 90 degrees to the right of the Y axis and may be communicated to the user as to the right. The transmitter UCS may have a specific relationship to its parent UCS and thus to the GCS. In some embodiments, the communications to the user are for the user when facing the transmitter (e.g., straight ahead, to the left, to the right turn around and proceed).

Still referring to FIG. 1, in some embodiments, the regional descriptive data is stored using Building Information Modeling (BIM). In some embodiments, in a BIM, not only physical attributes such as location and size are stored, but any information about any feature (or space) is stored, including any features as described above, such as without limitation architectural features, free-standing user features, user features, and the like. BIM is a common term in the CAD world of the construction industry. As a non-limiting example, BIM data for a give user feature 212, architectural feature 208, or navigable space 200 may include the X, Y and Z coordinates in a UCS, as described above. In some embodiments, this allows the calculation of distance to any other features UCS, even if that other feature is not in virtual map. The BIM data may include the orientation of the feature, with regard to the UCS, where orientation describes the tilt of a feature relative to a particular UCS plane. The BIM data may include a path tree connecting the feature to one or more other features as described above. Path tree may or may not describe a shortest distance between objects; for instance, path tree may describe a path to avoid obstacles such as walls or furniture. There may also be multiple paths to provide alternate routes to avoid features such as stairs. The BIM data may include attributes of the feature, including without limitation the name and type of space (or subspace) in which the feature is located, the type of feature (e.g. toilet, sink, dryer, checkout counter, elevator), the operation (e.g. flush valve, nozzle, motion sensor, location of operation (e.g., top of countertop, wall, fixture mounted, free standing), material covering surfaces (e.g. tile, carpet, stone, wood, or paint), color or distinguishing marks, or floors to which an elevator will travel, manufacturer information including warrantees, materials, methods used to produce, specifications, cleaning instructions, operation, replacement parts, and the like. BIM attributes may similarly be stored in an object-oriented data structure so that the attributes reference other databases and/or data structures. Part or all of virtual map may be stored at portable computing device 104 or at a remote device 120; a relevant portion of virtual map and/or regional descriptive data may be downloaded as needed, and as further described below in reference to FIG. 3.

With continued reference to FIG. 1, spatial information data structure 116 may include one or more computer-assisted design (CAD) models of spaces, including without limitation navigable spaces 200, and/or objects. In an embodiment, a CAD model may be used in the initial design of a navigable space 200, if navigable space 200 was built; CAD model may be updated upon rebuilding and/or remodeling of navigable space 200. CAD model may be updated with new elements, such as movable objects 220 or the like. User entries or other changes as described in further detail below may update augment, and/or overwrite one or more portions of CAD model; for instance and without limitation, location data pertaining to one or more movable objects 220 may be updated in CAD model.

With continued reference to FIG. 1, first data structure may include a table or similar structure linking unique identifier to a location in virtual map. First data structure may include a representation of navigable space 200. Representation of data in navigable space 200 may itself include a plurality of data elements that define specific spaces; for instance, where the navigable space 200 is a restroom, the data representation of that navigable space 200 may include the data representation of a navigable space 200 corresponding to a toilet stall, another corresponding to its a sink and its accessories, and another corresponding to a diaper changing station, all within the restroom; the navigable space 200 data for the restroom may also include be linked to the navigable space 200 data for a second restroom, an elevator lobby, a front entry, and for the building containing the restroom. This may be accessed by arrangement and traversal of a tree, or other data structure enabling recursive, linked, or serial enumeration of data structures, of navigable spaces 200, up to including buildings, blocks of buildings, campuses, or cities. In some embodiments, the data representation of each navigable space 200, whether it is a particular sink or toilet stall, a restroom, a building, or a city block, has a unique origin point corresponding to a specific location within the parent space of the navigable space 200, where the parent space is a navigable space 200 including the navigable space 200; for instance, the parent space of a toilet stall may be a restroom, and the parent space of a restroom may be a building. As a result, if portable computing device 104 determines a user's current location in any navigable space 200 within any other parent navigable space 200, specific information can be communicated to navigate to any other space within the parent navigable space 200, as all the origin points are connected according to the data representations. The representation of each navigable space 200 may include an exit/entry point corresponding to a physical exit/entry point for the navigable space 200; for instance the exit/entry point may correspond to a door or to the point in front of a sink, urinal, ATM, or similar feature. Location of a navigable space 200's origin point or exit/entry point may be stored in the data representation of the parent space, or in a tree structure one node higher in the tree structure. In some embodiments, the exit/entry point of a given space must be traveled through physically to access data corresponding to the space (upon entry) or data corresponding to parent or sibling spaces (upon exit).

Continuing to refer to FIG. 1, persons skilled in the art will be aware that the elements described above may be organized in other manners than in the object form described, as data may be organized in various ways depending on the programming language, protocols, or storage methods used, and other considerations; for instance, a relational database may arrange the data corresponding to each navigable space 200 in any manner using interrelated tables according to the dictates of efficient information storage and retrieval. Furthermore, information may be transferred from one form to another as convenient to the operation of the system; for instance, a single node in a tree structure corresponding to the navigable space 200 most immediately occupied by the user may be stored in a at least a transmitter within that space or may be conveyed to the receiver over the network in network packet form. Furthermore, the data may of course be stored according to any registry or other memory storage protocol within particular computing devices. Part or all of first data structure may be stored at portable computing device 104 or at a remote device 120 such as a server or the like; a relevant portion of first data structure may be downloaded as needed, and as further described below in reference to FIG. 3.

Continuing to refer to FIG. 1, portable computing device 104 may have access, either locally or at a remote device 120, to a data structure linking user activities to categories of objects. Data structure linking user activities to categories of user features 212 may include, without limitation, one or more database tables, a database, or any other suitable data structure. As a non-limiting example, a user activity may be stored in data structure as "use a urinal;" this may be linked in data structure to the categories "urinal," "bathroom," "sink," "toilet," "hand drier," and/or "paper towel rack," which may be user features 212 and/or navigational features a user would utilize in a usage sequence involving using a urinal. Other activities may be linked in the data structure to other feature categories; as a result, portable computing device 104 may be able to retrieve a list of user features 212 associated with a desired user action, as described in further detail below.

Still referring to FIG. 1, system 100 may include a user output device 124. User output device 124 may include a display 128; the display 128 may be any display as described below in reference to FIG. 4. The display 128 may be the display of a mobile device such as a smartphone or tablet. User output device 124 may include an audio output device, such as a speaker, headphones, or a wireless headset such as those typically paired to a mobile device. User output device 124 may include a tactile output device. In some embodiments, tactile output device is a device that outputs information that is intelligible using the sense of touch. Tactile output device may include a haptic output device such as a vibrator of a mobile device such as a smartphone, cellular phone, or tablet. In some embodiments, tactile output device produces patterns having geometric forms that are intelligible to the user using the sense of touch; for instance, tactile output device may output letters in braille using a set of retractable pins or bumps that can be extended and retracted to form braille characters, similarly to devices used with screen readers. Tactile output device may output other recognizable shapes, such as directional arrows or geometric forms; tactile output device may, as another example, output a map vignette of the immediate area including user features 212 or any user feature 212 data as described above. User output device 124 may be coupled to a mobile device; for instance, where portable computing device 104 includes a mobile device, user output device 124 may be coupled to the same mobile device. User output device 124 may be incorporated wholly or in part in a mobile device; for instance, user output device 124 may include the display 128 and speakers of the mobile device, as well as a tactile output device coupled to the mobile device. User output device 124 may be coupled directly to wireless receiver 108 and/or portable computing device 104 or may communicated with wireless receiver 108 and/or portable computing device 104 via a network; user output device 124 may be incorporated in or include a computing device and/or any element thereof, including without limitation a processor, wireless or wired communication input/output devices, navigation facilities, and the like. User output device 124 is configured to receive data from portable computing device 104; data may be received from portable computing device 104 by any suitable electronic or wireless means. User output device 124 is configured to provide the received data to the user. In some embodiments, providing data signifies presenting the data to the user in a form in which the user can understand the data; for instance, if the user has some visual impairment but is capable of reading large type or similarly accentuated directional features such as large directional arrows, providing data may include displaying large type on a display 128, such as a mobile phone or tablet screen, or displaying large symbols such as directional arrows on the display 128. Similarly, if the user is visually impaired but able to hear, providing data may involve presenting the data by means of an audio output device. Where the user is not able to see or hear, presenting the regional descriptive data may include providing data using a tactile device. Providing data may also involve a combination of the above-described means; for instance, the regional descriptive data may be presented to the user in audio form, combined with large displays of directional arrows or type, or with tactile information. User output device 124 may also be able to output content data. User output device 124 may also be able to output product data.

Continuing to refer to FIG. 1, portable computing device 104 may include additional components. For instance, portable computing device 104 may include an inertial measurement unit (IMU). IMU may be an electrical component that detects the motion of the wireless receiver 108. IMU may include, an accelerometer (not shown). IMU may include a plurality of accelerometers disposed to detect acceleration in a plurality of directions; for instance, three accelerometers disposed in three directions spanning three dimensions may be able to detect acceleration in any direction in three dimensions. IMU may include one or more gyroscopes. IMU may include a plurality of gyroscopes disposed to detect rotation about a plurality of axes; for instance, three accelerometers having axes spanning three dimensions may be able to detect acceleration in any direction in three dimensions. IMU may have both accelerometers and gyroscopes. IMU may have any other component or components capable of detecting linear or rotational motion. In some embodiments, IMU can determine substantially precisely the direction and magnitude of motion of the wireless receiver 108 relative to an initial reference frame and location; where the wireless receiver 108 is initially stationary, IMU may enable the wireless receiver 108 to determine substantially accurately any change in orientation or position of the receiver. In other embodiments the receiver is coupled to an IMU; for instance, where the receiver is coupled to a computing device such as a smartphone or tablet, the computing device may have an IMU.

Still viewing FIG. 1, portable computing device 104 may include a navigation facility (not shown), defined as any facility coupled to the computing device that enables the device accurately to calculate the device's location on the surface of the Earth. Navigation facilities may include a receiver configured to communicate with the Global Positioning System or with similar satellite networks, as well as any other system that mobile phones or other devices use to ascertain their location, for example by communicating with cell towers. Portable computing device 104 may use beacons for navigation, for instance determining its location by direction and strength of one or more beacon signals; directional information may be received as part of beacon signals. Beacons transmitting beacon signals may be calibrated by portable computing device 104, or by multiple such devices, as set forth in further detail below. Navigational means may include a compass, which may be any device capable reporting orientation to the points of the compass (e.g. North, South, East, West, and the like) of portable computing device 104, for instance and without limitation by sensing a magnetic field of the Earth.

Continuing to refer to FIG. 1, portable computing device 104 may be configured to perform any method and/or method steps described in this disclosure in any order. Portable computing device 104 may be configured to repeat any method or method steps described in this disclosure two or more times; iterations may use data and/or states established by previous iterations. Iterations may ignore or reset states or previous iterations. As an example, and without limitation, portable computing device 104 designed and configured to receive a first signal from a first transmitter 112 at a first location, parse the first signal for at least a textual element, extract, from the at least a textual element, an identifier of the first transmitter 112, establishing a spatial bounding constraint as a function of the identifier, retrieving regional descriptive data from a spatial information data structure 116 as a function of the identifier, wherein the regional descriptive data describes information within the spatial bounding constraint, generate a local area description as a function of the regional descriptive data and the spatial bounding constraint, and presenting the local area description to a user of the portable computing device 104.

Still referring to FIG. 1, any data stored in and/or retrieved from any data structure as described in this disclosure, including without limitation spatial information data structure 116 and/or any other data structure stored on a remote device 120 and/or on portable computing device 104 may be stored thereon by any of portable computing device 104, remote device 120, and/or any additional computing device and/or devices as described in this disclosure, which computing device and/or devices may be a part of system 100 and/or independently operated by a third party. Storage of data, generation of data, and/or modification of data may be performed using any process and/or process steps as described in this disclosure. Any method step and/or steps described in this disclosure as performed by portable computing device 104 may alternatively or additionally be performed by any other computing device, including without limitation remote device 120. Any method step and/or steps described in this disclosure as performed by remote device may alternatively or additionally be performed by any other computing device, including without limitation portable computing device.

Figure 3:
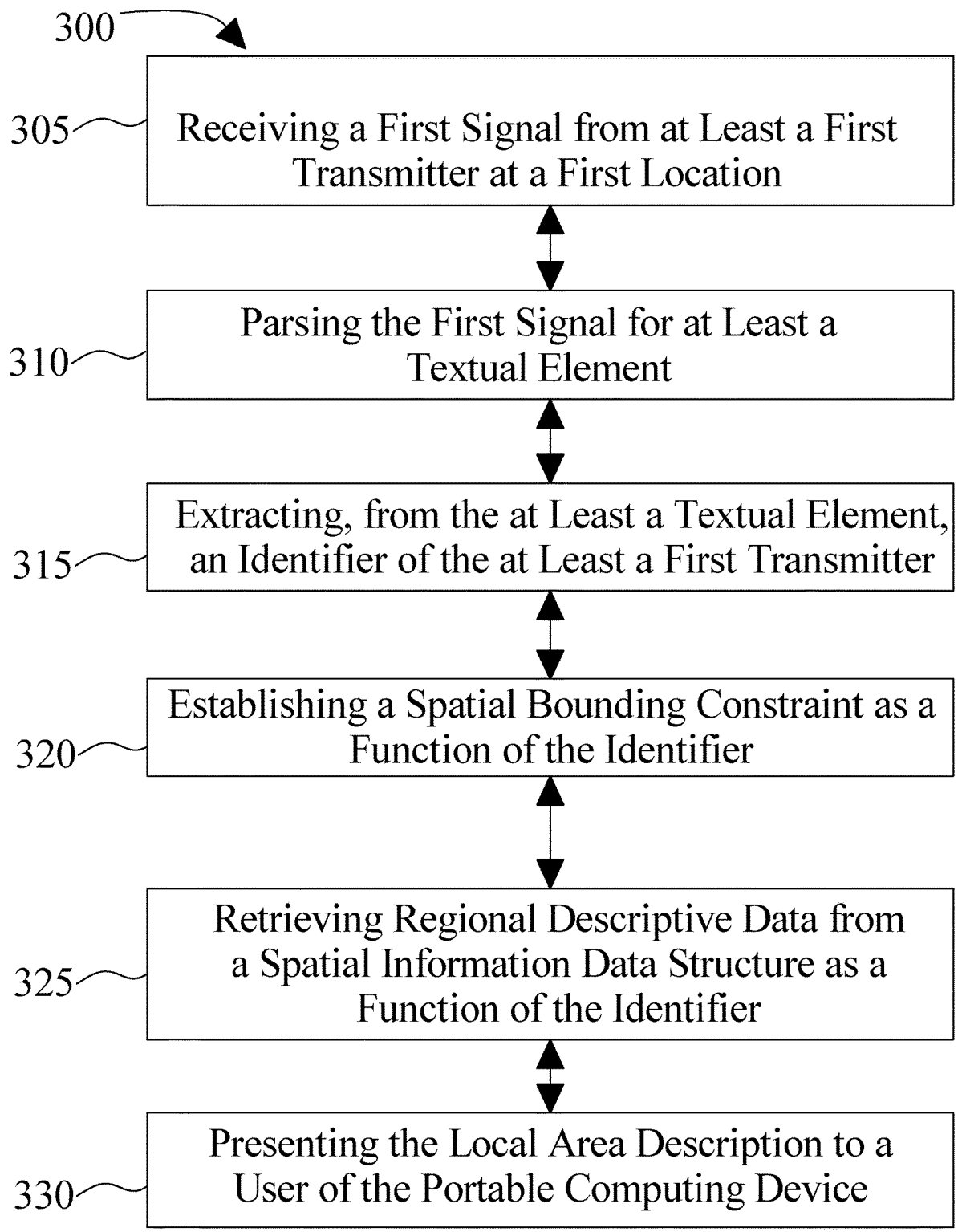
FIG. 3 is a flow diagram illustrating an exemplary embodiment of a method of wireless acquisition and presentation of local spatial information.

Referring now to FIG. 3, an exemplary embodiment of a method 300 of wireless acquisition and presentation of local spatial information is illustrated. At step 305, a portable computing device 104 in communication with a wireless receiver 108 receives a first signal from a first transmitter 112 at a first location. Portable computing device 104 may be any portable computing device 104 as described above in reference to FIGS. 1-2. Wireless receiver 108 may include any wireless receiver 108 as described above in reference to FIGS. 1-2. Reception of signal may be performed using wireless receiver 108, according to any means and/or methods as described above. For instance, and without limitation, first transmitter 112 may include a passive transponder, and receiving the first signal may include wirelessly transmitting, via an antenna of the wireless receiver 108, an interrogation signal providing electrical power to the first transmitter 112 and wirelessly receiving from the first transmitter 112, and via the antenna, a return signal. First transmitter 112 may be an active transmitter and/or transceiver, from which receiver may receive first signal without interrogation, and/or with or without first sending a signal to first transmitter 112; for example, first transmitter 112 may include a beacon, and receiving the first signal may include wirelessly receiving the signal from a beacon. Persons skilled in the art, upon reviewing the entirety of this disclosure, will be aware of various ways in which receiving the first signal may be accomplished consistently with this disclosure.

At step 310, and still referring to FIG. 3, portable computing device 104 parses first signal for at least a textual element. Where first signal is in digital form, portable computing device 104 may interpret a digital sequence contained within first signal by rendering it according to an encoding method for one or more data types; for instance, and without limitation, portable computing device 104 may divide a string of binary digits into fixed-length blocks, such as bytes of data, and map those blocks to a data type encoded by those blocks, according to any suitable protocol. As a non-limiting example, portable computing device 104 may interpret a binary string as character data. First signal may be received in a particular format, such as one or two packets; persons skilled in the art, upon reading the entirety of this disclosure, will be aware of many ways in which first signal may be encoded, transmitted, received, and decoded.

At step 310, and continuing to refer to FIG. 3, portable computing device 104 extracts an identifier of the transmitter from the at least a textual element. At least a textual element may implement a protocol whereby one or more fields or elements are labeled, such as, without limitation, XML, or packet-based protocols. At least a textual element may implement a protocol whereby fields in a prescribed order are separated by delimiter characters, which may be otherwise unused, such as commas in comma separated value (CSV) files. At least a textual element may be ordered in a strict character-count order, in which unique identifier is always found a particular number of characters from an endpoint and has a length of a particular number of characters. Portable computing device 104 may be configured to identify and copy unique identifier according to any protocol in which at least a textual element is encoded.

Still referring to FIG. 3, portable computing device 104 may extract at least an additional datum. At least an additional datum may include any additional data described above in reference to FIGS. 1-2, including without limitation regional descriptive data and/or feature data. At least an additional datum may include user-submitted data, which may have been written to a writeable section of memory as described above. Portable computing device 104 may provide the at least an additional datum to the user via the user output device 124; at least an additional datum may be provided with a usage sequence as set forward in further detail below or may be provided separately.

At step 320, and still referring to FIG. 3, portable computing device 104 establishes a spatial bounding constraint as a function of the identifier. Spatial bounding constraint may include any spatial bounding constraint as described above in reference to FIGS. 1-2, or any combination of such spatial bounding constraints. Spatial bounding constraint may be established using identifier; for instance, a default root location may be selected as a function of identifier, and/or a navigable space 200 containing identifier may be determined using, for instance, a record in a data structure such as spatial information data structure 116. Establishing spatial boundary constraint may alternatively or additionally be performed using a user-specific default spatial boundary constraint, automatically generated spatial boundary constraint, and/or user-selected spatial boundary constraint, such as establishing current user location as root location or the like based on data stored on portable computing device 104, and association of that spatial boundary constraint with identifier.

Still referring to FIG. 3, establishing spatial bounding constraint may include selecting a root location; in other words, spatial bounding constraint may include a root location. This may be implemented according to any means or process as described above in reference to FIGS. 1-2. For instance, and without limitation, root location may include a location of first transmitter 112. Root location may include a location of user. Root location may include a location of a feature. Portable computing device 104 may identify root location in a data structure linking features to transmitters; data structure may include, without limitation, spatial information data structure 116 as described above. Portable computing device 104 may identify root location based on usage data of the user. Portable computing device 104 may identify root location based on usage data of a plurality of users; for instance, and as described above in reference to FIGS. 1-2, root location may be selected based on root location selected by or for a majority or other significant fraction of users located at first transmitter 112. Portable computing device 104 may identify root location depend based on an intended user action. Portable computing device 104 may identify root location based on a user-specific need.

In an embodiment, root location may be at some distance from user and/or first transmitter 112. As an illustrative example, root location may be a place with limited or no network connection, such as a top of a mountain, a waterfall in the woods, or a location underground; when portable computing device 104 receives first signal, user may be at a location, such as an entryway or station having network access, where user may perform one or more steps of method 300 the performance of which involve network connectivity as set forth in further detail below, followed by travel to root location, where data so acquired may be used to perform further steps of method 300. For instance, a portion or all of a data structure 116, and/or of data contained therein, may be downloaded to portable computing device 104. To further continue the illustration, reception of first signal may occur when user is at an information center or the like near to a cave, and root location may be a chamber in the cave, some distance underground, such that user may travel to the chamber, for instance as part of a tour, and then receive a description from portable computing device 104 concerning the chamber upon arrival. Persons skilled in the art, upon reviewing the entirety of this disclosure, will be aware of various further examples for selection of root location as consistent with descriptions provided herein.

Continuing to view FIG. 3, spatial bounding constraint may include a geometrically defined region around the root location; this may be implemented as described above in reference to FIGS. 1-2. Spatial bounding constraint may include an object-density function of distance from root location as described above in reference to FIGS. 1-2. Object-density function may depend on importance of objects, as described above in reference to FIGS. 1-2; importance may include importance for a user-specific need, importance for intended user action, importance for context in a space such as without limitation a room, or the like. Spatial bounding constraint may include a navigable space 200; navigable space 200 may be a navigable space 200 containing the at least first transmitter 112 or may be a navigable space 200 some distance from first transmitter 112, such as without limitation a cave chamber or the like as described above.

At step 320, and still viewing FIG. 3, portable computing device 104 retrieves regional descriptive data from a spatial information data structure 116 as a function of the identifier, wherein the regional descriptive data describes information within the spatial bounding constraint. Spatial information data structure 116 may include any spatial information data structure 116 as described above in reference to FIGS. 1-2. For instance, and without limitation, spatial information data structure 116 may include a map. As a further non-limiting example, spatial information data structure 116 may include a BIM. Retrieval may be accomplished by forming a query and using the query to find matching data in spatial information data structure 116; query may include identifier and/or one or more elements of spatial bounding constraint.

Still referring to FIG. 3, regional descriptive data may include any regional descriptive data as described above. For instance, and without limitation, regional descriptive data may describe fixed objects 216 within the spatial bounding constraint, as described above in reference to FIGS. 1-2; objects may include, without limitation, any non-living items. Regional descriptive data may describe movable objects 220 within the spatial bounding constraint, as disclosed above in reference to FIGS. 1-2. Regional descriptive data may include at least a temporal attribute, as described above. At least a temporal attribute may include a time of validity, such as without limitation timestamp showing when one or more movable objects 220 were reported to be located where the regional descriptive data indicates they are located; this may be used, without limitation to (a) determine that movable objects 220 are arranged in an anomalous fashion according to schedules (either deterministic or statistical) as described in further detail below, and/or (b) to place movable objects 220 whose placement is unaffected by the schedule. For instance, and as described below in further detail chairs, dividers, lecterns and the like might get moved around according to a class schedule, but trash cans may be unaffected by that, and so may be expected to be wherever they were last reported. Schedule data may further include, without limitation, bus, train, or other transit schedules. At least a temporal attribute may include or be included in a calendar or other schedule. In a non-limiting example provided for illustrative purposes, root location may include a location on a book, spatial bounding constraint may include the book itself, and descriptive data may include contents of the book.

Still viewing FIG. 3, regional descriptive data may include data that is available to and/or identical for, all users; for instance, at a particular location such as a historical monument, regional descriptive data may include data describing the particular location, such as historical data, which all users may receive regardless of status, group membership, access rights, or the like. Alternatively or additionally, regional descriptive data may include one or more elements of data that are available to and/or specifically returned by default based on user data, such as user logon credentials, user membership in a group, or the like. For instance, and without limitation, a user may be identified by remote device 120, portable computing device 104, and/or at least a first transmitter 112 as a user that entered or has access rights, is set to view by default, or has requested to view to a particular datum, which may be included in regional descriptive data based on detection by remote device 120, portable computing device 104, and/or at least a first transmitter 112 of user identifier and/or credentials; user identifier and/or credentials may be transmitted to any of remote device 120, portable computing device 104, and/or at least a first transmitter 112, and any such device may forward user identifier, user credentials, or any other datum indicating access rights to a user or group-specific datum. Remote device 120, portable computing device 104, and/or at least first transmitter 112 may alternatively or additionally determine based on user credentials or identification that the user has no access rights, has not requested to view, and/or has requested not to view a particular datum. User credentials and/or identifier may link user to a group, such as a group of users having a common interest in an area within or near to spatial bounding constraint, a group of employees, officers, or others with a professional interest in an area within or near to spatial bounding constraint, including without limitation employees, officers, or others connected with an owner of at least a first transmitter 112 and/or the area, a group of persons charged with or volunteering to care for the area, or the like, or a group of persons with particular general interests or needs, such as needs for accommodations. Non-limiting examples may include tour groups at a university, professors at the university, and/or students at the university, each defining a group that might have different data provided either based on access rights or by default. Data pertaining to an individual user may also pertain to interests, duties, or needs for accommodations of the individual user. For example, and without limitation, schedule information may be user-specific, such as a student's class schedule at a campus stating class name, teacher, building and/or classroom, which may depend on an individual student; such information may be accessed as part of a university (group) database or entered by the student as part of his or her private database and/or private table or set of records in a data structure 116.

Continuing to refer to FIG. 3, regional descriptive data may include at least a user-entered value. At least a user-entered value may include any item of regional descriptive data including without limitation description of appearance, historical, scientific, or biographical data, and/or position of one or more objects. User-entered value may be provided as set forth in further detail below. User-entered value may be stored in data structure 116 in records accessible only to user, in records accessible to one or more groups in which user is a member, and/or in records accessible to the public; user may be given a choice to specify which of user-specific, group, or public access should be applicable to user-entered value, including without limitation specification of which group of a plurality of groups in which user is a member should receive the data. Alternatively or additionally, system 100 may restrict user ability to enter public and/or group data; for instance public data may be modifiable only to users belonging to a group working for an owner of at least a first transmitter 112, user-added information may be permitted only in certain portions of public data, such as a repository or forum for user feedback or the like, and/or group data may be modifiable or added to only for group members. Persons skilled in the art, upon reviewing the entirety of this disclosure, will be aware of various categories and/or forms of access users may be provided for entering and/or receiving regional descriptive data.

Still referring to FIG. 3, regional descriptive data may include safety data. "Safety data," as used in this disclosure, is data describing objects and/or facilities located at, within, or adjacent to an area defined by and/or overlapping spatial bounding constraint, and/or use thereof, affecting, protecting and/or improving safety of persons at, within, or near to an area defined by and/or overlapping spatial bounding constraint. Safety data may include identification of organizations, groups, and/or individuals responsible and/or available for provision of safety and/or emergency assistance in an area overlapping spatial bounding constraint, such as police departments, fire departments, local institutional and/or private security, lifeguards, medical technicians such as without limitation emergency medical technicians (EMTs), medical professionals, or the like. Safety data may include procedures and/or protocols to be used to preserve safety and/or to respond to emergencies, such as without limitation procedures to perform in case of a fire or fire alarm, if a person is caught in a riptide, in case of inclement weather, in case of a release of toxic and/or radioactive material, in response to bomb threats and/or detonations, in response to active shooter scenarios, in case of escaped animals and/or wildlife-related threats, or the like. Procedures and/or protocols may alternatively or additionally include instructions for contacting and/or alerting to an emergency and/or safety-related problem organizations, groups, and/or individuals responsible and/or available for provision of safety and/or emergency assistance in an area overlapping spatial bounding constraint; such instructions may include contact information and/or helplines to such organizations, groups, and/or individuals. Procedures and/or protocols may include instructions for identifying and/or alerting organizations, groups, and/or individuals responsible and/or available for provision of safety and/or emergency assistance in an area overlapping spatial bounding constraint regarding pregnancy, illness, bullying, perceived security threats or other hazards, and/or any other phenomenon potentially affecting safety and/or involving an emergency. Procedures and/or protocols may be received from and/or generated by organizations, groups, and/or individuals responsible and/or available for provision of safety and/or emergency assistance in an area overlapping spatial bounding constraint.

For example, and without limitation, safety data may include construction methods and/or materials of structures and/or objects within and/or overlapping spatial bounding constraint, including without limitation fire rating, type of structure such as wood structures for floors, c thru h, basement, attic, and/or canopies, combustible materials on walls, ceilings, floors, anti-seismic properties and/or properties, or the like. Safety information may include locations of system controls such as, without limitation, controls for elevators, fire door closures, alarms, sprinkler systems, video systems, audio systems, electrical panels such as without limitation circuit breaker, or the like. Safety information may include locations and types of hazardous materials within and/or near to an area overlapping spatial bounding constraint. Safety information may include locations and/or other data concerning safety zones within and/or near to an area overlapping spatial bounding constraint. Safety information may include location and/or status of emergency and/or care equipment, including fire extinguishers, defibrillators, emergency medications such as without limitation epinephrine, anti-seizure medication, insulin, anticoagulants, paralytics, and the like, emergency medical supplies such as without limitation surgical equipment, bodily fluids such as blood and/or plasma, platelets, albumin, tourniquets, transport equipment, oxygen delivery systems and supplies, pain-management supplies, anesthetics, intubation equipment, intravenous equipment, and/or communication lines or the like to call for emergency assistance, emergency codes. Safety data may include any data identifying emergencies and/or emergency alarms or notifications. Safety data may include any data concerning and/or indicating how to respond in cases of emergencies. Safety data may be provided to emergency responders arriving in and/or responding to emergencies within an area overlapping spatial boundary constraint.

Continuing to refer to FIG. 3, regional descriptive data may include personal data of a person within spatial bounding constraint, within an area overlapping spatial bounding constraint, and/or otherwise linked to spatial bounding constraint. Person within area overlapping spatial bounding constraint may include, without limitation, a student, instructor, provider of medical care, medical patient, repair or equipment maintenance professional, and/or any other person who may be located in such an area as determined by system 100, for instance and without limitation by interacting with system 100 using a portable computing device as described in this disclosure. Such personal data may include an identifier of a person, a name, a professional identification number, a profession, a rank, and/or any other data concerning the person. For example, and without limitation, where spatial bounding constraint contains and/or defines a hospital and/or medical examination room, regional descriptive data may include a patient identifier of a patient that is currently in the room and/or with data relevant to the patient that is in the exam or hospital room; such data may include, without limitation, a patient's medical history data, information on current ailment, current treatment processes and/or regimens, current medications, allergies and/or other sensitivities of note, or the like. Regional descriptive data may include legal information, such as power of medical attorney, power of financial attorney, wills, advance directives, "living wills," or the like. Personal data may include organizational role data, defined for this purpose as data describing a role, position, and/or set of responsibilities, duties, and/or privileges a person within and/or otherwise connected to spatial bounding constraint possesses. Personal data may include credential data such as without limitation professional licenses, certifications, job titles, or the like. As a non-limiting example, where spatial bounding constraint contains, is contained in, and/or overlaps a medical facility such as a hospital, clinic, long-term care facility, or the like, regional descriptive data may identify a doctor, nurse, medical technician, and/or other staff member assigned to a room, patient, patient family, patient friends, station, and/or floor overlapping spatial bounding constraint, as well as professional history, education, awards, specialties, recognitions, or other information of such doctor, nurse, medical technician, and/or other staff member. Circumstantial data, as described in further detail below, may be used to determine whether portable computing device, and/or a user thereof, is authorized to receive, store, decrypt, and/or output one or more elements of regional descriptive data, including without limitation personal and/or medical data, for instance to comply with privacy regulations governing one or more categories of data.

Further referring to FIG. 3, regional descriptive data may include data identifying and/or describing one or more living organisms in an area overlapping spatial boundary constraint. For instance, and without limitation, regional descriptive data may identify one or more animals, such as animals in zoos, aquariums, pet hospitals, boarding facilities, pet stores, farms, ranches, nature preserves, lakes, oceans, and/or in the air near to and/or at spatial bounding constraint. Animals may include any animals from any phylum. Regional descriptive data may describe, without limitation, any prokaryotic and/or eukaryotic single-celled organisms and/or colonies, including without limitation protozoa, algae, amoebas, bacteria, archaea, or the like. Regional descriptive data may include descriptions of diseases and/or pathogens, including bacteria, viruses, pathogenic fungi, pathogenic prions, and/or parasites. Regional descriptive data may describe and/or identify one or more plants, such as indoor and/or outdoor trees, shrubs, herbs, vines, mosses, ferns or the like. Regional descriptive data may describe and/or identify one or more fungi and/or fungal fruiting bodies such as mushrooms. Regional descriptive data may include instructions for care and/or propagation of living organisms, including watering, feeding, sunlight needed, habitat requirements such as soil or other grown media, temperature requirements, symbiotic and/or otherwise beneficial relationships with other organisms such as bees, or the like. Regional descriptive data may include safety information pertaining to living organisms such as information relating to toxins such as poison and/or venom, allergies, behavior such as predatory and/or territorial behavior, danger of falling branches and/or fruiting bodies, or the like.

Still referring to FIG. 3, regional descriptive data may include construction history of a structure, such as without limitation a building, overlapping spatial bounding constraint. Construction history may include without limitation construction methods, additions, builders, architects, engineers, donors, historical events, or the like. Regional descriptive data may include a function of a space, such as without limitation a room, overlapping spatial bounding constraint; examples may include, without limitation, a purpose of a hospital room, medical room, laboratory, lecture room, or the like. Regional descriptive data include a description and/or status of equipment located within spatial bounding constraint; for instance, and without limitation, regional descriptive data may include equipment in a hospital room, status of equipment in hospital room, or the like. As a further non-limiting example, where spatial bounding constraint overlaps a classroom and/or lecture room, regional descriptive data may include data identifying and/or describing a status of lecture equipment, audiovisual equipment, or the like. Regional descriptive data may include a current and/or scheduled room and/or space configuration, including without limitation a current and/or scheduled configuration of partitions, seating, lecterns, equipment, or the like. Regional descriptive data may include schedule information such as a class schedule, a schedule of equipment use and/or procedures to be performed in hospital room, or the like. Regional descriptive data may include exhibit and/or touring information such as information pertaining to history and/or contents of art exhibits, science exhibits, other museum exhibits, exhibits in zoos and/or aquariums, stations along historical and/or nature trails, or the like. Regional descriptive data may include historical data relating to an object within spatial bounding constraint and/or within an area overlapping spatial bounding constraint. Regional descriptive data may include current reservation data of a space, room, object, and/or piece of equipment such as without limitation a hotel room. Regional descriptive data may include bus and/or train timetables or other schedule information.

Regional descriptive data may include one or more elements of data describing performances, athletic contests, or artistic endeavors, such as without limitation times, durations, participants, and/or contents of plays, operas, symphonies, contests of team sports such as basketball, football, soccer, cricket, or rugby matches, rodeos, races, or the like. Information may include cast, players, directors, set designers, musicians, docents, financial supporters, conductors, teams, officials, coaching staff, owners, support organizations, cheerleaders, organizers, artists, or the like. Information may include data such as without limitation sporting statistics for a game, season and/or lifetime of a player, curriculum vitae or other biographical and/or professional information concerning performers and/or other persons, or the like. Information may include data concerning a stadium, auditorium, amphitheater, or other performance space overlapping spatial bounding constraint.

At step 325, and still referring to FIG. 3, portable computing device 104 generates a local area description as a function of the regional descriptive data, the spatial bounding constraint, and an element of circumstantial data. As used in this disclosure, "circumstantial data" is any data, excluding user location or a user entered request, describing circumstances affecting, and/or a current condition of the user, of items, including objects and/or living organisms, within spatial bounding constraint, and/or a space overlapping spatial bounding constraint. Circumstantial data may include without limitation a personal schedule, space and/or room schedule status, or other current schedule detail. As a further non-limiting example, circumstantial data may include data describing history of user interactions with system; such history of user interactions may be used to predict a likely current and/or future user interaction.

With continued reference to FIG. 3, portable computing device 104 and/or a remote device may predict a likely current and/or future user interaction, and or determine one or more elements of data to incorporate in local area description, using a machine-learning process. A machine-learning process, as used in this disclosure, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

Still referring to FIG. 3, training data, as used in this disclosure, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and continuing to refer to FIG. 3, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by portable computing device 104 may correlate any input data as described in this disclosure to any output data as described in this disclosure.

Continuing to refer to FIG. 3, as a non-limiting illustrative example, training data may include data describing past user interactions by a current user of portable computing device 104, data concerning and/or describing the current user, past interactions by other users, and/or data describing other users. Such data may correlate, without limitation, one or more sets of interactions and/or user data to one or more subsequent interactions, elements of data in a local area description, or the like.

Still referring to FIG. 3, portable computing device 104 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 3, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data.

Still referring to FIG. 3, machine-learning algorithms may include supervised machine-learning algorithms. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs such as previous user actions, contextual data, regional descriptive data, or any other data as described in this disclosure, predicted future and/or current user actions, needs, or other data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of supervised machine learning algorithms that may be used to determine relation between inputs and outputs.

Supervised machine-learning processes may include classification algorithms, defined as processes whereby a computing device derives, from training data, a model for sorting inputs into categories or bins of data. Classification may be performed using, without limitation, linear classifiers such as without limitation logistic regression and/or naïve Bayes classifiers, nearest neighbor classifiers, support vector machines, decision trees, boosted trees, random forest classifiers, and/or neural network-based classifiers.

Still referring to FIG. 3, machine learning processes may include unsupervised processes. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 1, machine-learning processes as described in this disclosure may be used to generate machine-learning models. A machine-learning model, as used herein, is a mathematical representation of a relationship between inputs and outputs, as generated using any machine-learning process including without limitation any process as described above, and stored in memory; an input is submitted to a machine-learning model once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Further referring to FIG. 3, lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data. Heuristic may include selecting some number of highest-ranking associations and/or training data elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Still referring to FIG. 3, portable computing device 104 and/or a remote device may use training data as described above to generate a classifier classifying one or more recent user interactions and/or user data to a predicted step, a predicted user need, a predicted user role, or the like.

In an embodiment, and continuing to refer to FIG. 3, circumstantial data may include a user orientation which may, for instance, be determined as described above. Circumstantial data may include a recent direction of user travel; recent direction of user travel may be determined in any way described in this disclosure, including without limitation by determining an order of interaction with transmitters as described herein, a navigational sequence and/or set of instructions user of portable computing device 104 is following and/or has recently followed. Circumstantial data may include a current occupancy within the spatial bounding constraint, such as without limitation one or more patients, students, instructors, technicians, or other persons who are within a space that overlaps spatial bounding constraint. As a non-limiting example, an NFC tag or beacon in/at a medical exam room and/or or hospital room to get information about a patient, doctor, staff, or ailment of the patient in that room; in an embodiment, similar occupancy data may be included regarding nursing homes, assisted living, group homes, rooms therein, or the like. As a further non-limiting example, circumstantial data may include a role-based association with the spatial bounding constraint, such as an assignment of a shift, floor, room, or the like associated with spatial bounding constraint to a medical professional, worker, technician, professor, lecturer, laboratory director and/or technician, researcher, or the like. Role-based data may include data provided to emergency responders arriving in and/or responding to emergencies within an area overlapping spatial boundary constraint, for instance as described in further detail below. Role-based data may be controlled according to user authorization as described above; for instance, medical data such as patient history, current treatment regimen, or the like may be provided only to a user whose role-based data indicates to be a medical professional, and whose logon or authorization data indicates is authorized to view the medical data.

Still referring to FIG. 3, one or more elements of data used in methods described in this disclosure may be generated and/or retrieved as a function of one or more elements of circumstantial data. For instance, and without limitation, spatial bounding constraint may be established as a function of circumstantial data; as an example, a spatial bounding constraint may be established as a floor, room, and/or other region to which a user of portable device is assigned, as a set of trails rooms, and/or areas included in a tour or sequence of locations for the user to visit, or the like. For instance, and without limitation, a user role indicating electrician or plumber may translate to spatial bounding constraint encompassing a whole building or section thereof, permitting information to be provided concerning pipes or wires running to or from a room containing first transmitter. A professor scheduled to perform a lecture within a given lecture room may be provided a spatial bounding constraint limited to that room, which may further be provided even if the professor is in a different room and/or corridor of a building containing the lecture room. As a further non-limiting example, a user who is moving rapidly as detected by a rate of interactions with transmitters, an IMU or other motion sensor of portable computing device, or the like, may be provided a spatial bounding constraint that is larger, or that contains a lengthier projected future user path, than a spatial bounding constraint provided to a slower-moving user. As an additional non-limiting example, a user whose role data and/or authorization data indicates that the user is allowed to access maintenance shafts, engine rooms, or other role-specific and/or authorization-specific areas may receive a spatial bounding constraint including such areas, while a user lacking such role and/or authorization data may be provided a spatial bounding constraint excluding such areas.

Local area description, as used herein, is a set of data describing objects and/or people within spatial bounding constraint to user of portable computing device 104, where people may be detected using local communication with user devices on the persons of various users, history of interaction with system 100 such as interaction with at least a first transmitter 112 and/or remote device 124, or the like. In an embodiment, local area description is generated by collecting or collating regional descriptive data; alternatively or additionally, local area description may be generated by filtering regional descriptive data according to one or more user criteria. Generating the local area description may include generating a prediction of a current location of a first movable object 220. Prediction may include determining a default location for a movable object 220; default location may be recorded in and/or received with regional descriptive data. Default location may be recorded in memory of portable computing device 104. Default location may have been entered manually by a user or may have been determined using any process described below usable for generating prediction. Default location may include or be included in an initial description of objects within spatial boundary constraint, which may be modified using further methods and/or means as described below.

Continuing to refer to FIG. 3, generating prediction of the current location may include calculating the prediction as a function of a plurality of previous locations. Plurality of previous locations may include user-entered locations for movable object 220, which may be entered according to any process or process steps for user entry as described below. Calculating prediction may include statistically determining a most likely current location using previous entries; statistical calculation may, as a non-limiting example, include association of previous entries with a day of the week, time of day, or other current temporal attribute, as well as calculation of a mean value or the like. Calculating prediction may include generating a placement schedule as a function of the plurality of previous locations; a placement schedule as used herein is a data structure describing likely positions of at least a movable object 220 at particular times. Generating prediction may include retrieving a placement schedule, for instance from spatial information data structure 116 and/or as part of regional descriptive data and calculating the prediction of the current location based on the placement schedule. Calculating the current location based on the placement schedule may include receiving data describing a location of a second movable object 220, the data including a temporal attribute, retrieving the placement schedule as a function of the data describing the location of the second movable object 220, and calculating the prediction of the current location based on the placement schedule. For instance, and without limitation, portable computing device 104 may receive information having a temporal attribute and describing position of one movable object 220, compare that information to a location predicted according to a placement schedule, and predict other items' positions according to schedule; as a non-limiting example, where a room is "supposed" to be set up for a big conference, but a divider is in place, portable computing device 104 may determine that the room is in "small conference" position as a result, and predict chair placement on that basis.

Still referring to FIG. 3, portable computing device 104 and/or a remote device may generate a prediction of a position and/or orientation of a movable object using machine-learning as described above. For instance, and without limitation, training data including past detected positions and/or other associated information such as time of day, schedule information, one or more elements of circumstantial data, and/or one or more additional past positions may be used to generate a supervised machine-learning model and/or classifier taking a most recently detected and/or reported position and/or one or more other data such as time of day or the like as inputs and outputting a predicted future and/or current position. Thus, portable computing device 104 and/or a remote device may use such a model, classifier, and/or a lazy-learning algorithm with similar inputs and outputs to determine a likely and/or probable current position of a movable object given a previously detected and/or reported position, one or more elements of circumstantial data, and/or one or more elements of regional descriptive data.

Generating local area description may include generating the description based on a user-specific need, as described above; for instance, generating local area description may include filtering regional descriptive data according to a user-specific need. Generating local area description may include generating the description based on an intended user action, as described above; for instance, generating location area description may include filtering regional descriptive data according to an intended user action. Local area description may be modified to emphasize significance of one or more objects as noted above; significance may be weighted or determined according to user need, desired activities, usage data of this user or all users, or the like. Local area description may be user-specific, which may be accomplished by generating the local area description according to user needs, intended user activities, and/or user interests explicitly entered or determined from analysis of past interactions with user. Local area description may include group or user schedule and/or other information concerning one or more objects within spatial bounding constraint; as a non-limiting example, an object may be a book, and local area description may describe some table of contents, index, or other content material, a current page, chapter, problem set, or the like user and/or a group such as a class is evaluating, or the like.

In an embodiment, portable computing device may generate local area description as a function of circumstantial data. As a non-limiting example, portable computing device may receive regional descriptive data as a function of circumstantial data. For instance, portable computing device may receive circumstantial data, transmit circumstantial data to remote device 120, which may combine circumstantial data with other data to query spatial information data structure 116 and/or may filter regional descriptive data prior to transmitting to portable computing device; remote device 120 may alternatively or additionally receive circumstantial data from a source other than portable computing device 104, which may not directly receive circumstantial data at all. Alternatively or additionally, portable computing device may filter regional descriptive data based on circumstantial data.

Still referring to FIG. 3, portable computing device 104 may alternatively or additionally generate local area description from regional description data using circumstantial data. For instance, and as described in further detail below, portable computing device 104 may determine from user orientation which objects are in front of user and/or in a range of view of user; data concerning such objects may be incorporated in local area description. As a further non-limiting example, local area description may be generated based on a recent direction of travel of user, which may, for instance, indicate a likely purpose of travel and/or visit to an area overlapping spatial boundary constraint. Circumstantial data may, in a non-limiting example, limit information provided to user according to a category, schedule, need, or the like of user. For instance, and without limitation, user may have a schedule indicating that a space, such as without limitation a room or other area overlapping spatial bounding constraint, is a location for a class, presentation, tour, or the like in which user is enrolled, for which user is an instructor or presenter, or the like. Where user has a particular role, such as an electrician, plumber, doctor, and/or other specialized role, local area description may provide user with information pertaining to that role; for instance, patient medical history and/or other patient facts may be provided only to a doctor and/or nurse, based for example on logon information. One or more elements of local area description may alternatively or additionally include accessibility information matched, for instance, to a user profile including user accessibility needs.

Still referring to FIG. 3, generating local area description may include detecting an emergency and generating the local area description as a function of the emergency; in other words, circumstantial data may include a detection of an emergency, a description of an emergency, and/or other data concerning an emergency, which may be referred to herein collectively as "emergency data." Emergency data may include, without limitation, a type of an emergency; for instance, emergency data may identify an emergency within and/or potentially affecting an area overlapping spatial bounding constraint, including emergencies and/or causes thereof originating and/or currently outside such an area, as a fire, flood, electrical problem, release of toxins and/or radioactive material, release of pathogens, an attack and/or threatened attack by a malefactor such as without limitation a terrorist and/or active shooter, a bomb threat, an escaped animal, an explosion, an earthquake, a volcanic eruption, a medical emergency such as a heart attack and/or stroke, a drowning or any other emergency that may occur to a person skilled in the art, upon reviewing the entirety of this disclosure.

Still referring to FIG. 3, emergency data may include a location of an emergency. Location of emergency may be determined by system 100 and/or any device incorporated in and/or in communication with system 100 because of interaction with one or more sensors such as without limitation sensors incorporated in alarm systems or the like; sensors may be installed in building and, for instance, connected to a wired or wireless networks as described in this disclosure. Sensors may be integrated in one or more users' portable computing devices; for instance, heat sensors may detect fire, one or more motion sensors may detect seismic activity, or the like. Alternatively or additionally, location of an emergency may be received as a result of interaction between portable computing devices, remote devices, and/or transmitters as described above. For instance, and without limitation, a user may report seeing emergency, such as a fire, smoke, an active shooter or other security threat, or the like, and system 100 may determine user location and/or portable computing device location as a result of interaction with a transmitter and/or other methods as described above. Alternatively or additionally, where a user has been identified as an originator of and/or participant in a security threat, system 100 may determine that the user has passed within range of one or more transmitters, and may determine a location and/or direction of travel of the user as a result.

Still referring to FIG. 3, local area description may include one or more instructions for escaping, surviving, and/or otherwise reacting to a detected emergency, which may be described for purposes of this disclosure as "emergency instructions." Emergency instructions may depend on contextual information. For instance, local area description may include instructions for escaping and/or surviving the emergency. Instructions may depend on an emergency type. For instance, instructions may specify avoidance of elevators for some kinds of emergencies such as fires, evacuation from a building for toxic or radioactive spill, relocation near columns and/or other reinforced structures for earthquake or the like. Emergency instructions may include a route and/or set of navigation instructions to a hiding place, to an anti-seismic place, for a route to escape from a space such as a room, floor, and/or building, for a route to a piece of emergency equipment, or the like. Emergency instructions may include instructions for use of emergency equipment. Navigation instructions and/or instructions for use of one or more elements of equipment such as without limitation safety equipment may be performed as described in U.S. Nonprovisional application Ser. No. 16/247,547, filed on Jan. 14, 2019, and entitled "DEVICES, SYSTEMS, AND METHODS FOR NAVIGATION AND USAGE GUIDANCE IN A NAVIGABLE SPACE USING WIRELESS COMMUNICATION," the entirety of which is incorporated herein by reference.

Still referring to FIG. 3, one or more instructions may include any safety data as described above, including identification of organizations, groups, and/or individuals responsible and/or available for provision of safety and/or emergency assistance in an area overlapping spatial bounding constraint, such as police departments, fire departments, local institutional and/or private security, lifeguards, medical technicians such as without limitation emergency medical technicians (EMTs), medical professionals, or the like. One or more instructions may include procedures and/or protocols to be used to preserve safety and/or to respond to emergencies, such as without limitation procedures to perform in case of a fire or fire alarm, if a person is caught in a riptide, in case of inclement weather, in case of a release of toxic and/or radioactive material, in response to bomb threats and/or detonations, in response to active shooter scenarios, in case of escaped animals and/or wildlife-related threats, or the like. Procedures and/or protocols may alternatively or additionally include instructions for contacting and/or alerting organizations, groups, and/or individuals responsible and/or available for provision of safety and/or emergency assistance in an area overlapping spatial bounding constraint of an emergency.

In an embodiment, and with continued reference to FIG. 3, a selection of emergency instructions such as routes and/or use of sheltering locations and/or emergency equipment may depend on further circumstantial information; for instance, where there are a plurality of potential routes, routes intersecting a location of an emergency, a direction of travel of a security threat, or the like may be eliminated from plurality of routes, leaving only routes that do not intersect the location and/or direction of travel. As a result, for instance, a user of portable computing device 104 may be directed to a stairway that is not on fire and/or in the opposite direction from which an active shooter is coming. System 100 and/or portable computing device 104 may store one or more rules dictating which of a plurality of possible options to provide to a user. For instance, a number may be stored in memory of system 100 and/or portable computing device 104 representing a radius or estimated time of convergence of an active shooter or other security threat; where distance from location of active shooter and/or other security threat to spatial bounding constraint and/or location of portable computing device 104 is less than the stored number, emergency instructions indicating that user should shelter in place and/or barricade or lock a door may be provided, whereas if the distance or convergence time is greater than the stored number, directions to follow an escape route may be provided, potentially combined with a counter indicating how much time remains before the distance and/or convergence time will fall below the number and escape will not be recommended. Alternatively or additionally, where a location of an active shooter and/or security threat is unknown, instructions may indicate to shelter in place as described above.

Still referring to FIG. 3, emergency instructions may be combined with safety information and/or user need/accommodation information as described above; for instance, routes for evacuation and/or avoidance of emergency may be determined as navigation instructions via facilities and/or using accommodations that permit user to navigate. Instructions may include use of one or more elements of safety equipment, such as a defibrillator where emergency is a cardiac emergency, a fire extinguisher for a fire, or the like.

At step 330, and still referring to FIG. 3, portable computing device 104 presents local area description to a user of the portable computing device 104. Presenting the local area description to the user may be accomplished using any means or methods suitable for presentation of data to a user as described above in reference to FIGS. 1-2, including without limitation transmitting information based on the local area description to a user output device 124. For instance, and without limitation, presenting the local area description to the user may include presenting the local area description using an audio, visual or tactile output device.

With continued reference to FIG. 3, presenting the local area description to the user may include presenting local area description in an order based on proximity to a root location. For instance, and without limitation, presentation of local area description may describe items closer to user first, and items farther from users later; presentation of local area description may describe items closer to a root location first and describe objects farther from the root location later. Presenting local area description to the user may include presenting the local area description in an order based on user orientation; for instance, objects described to the user may include objects in front of the user or in a range corresponding to a typical person's field of vision, as determined from an apparent direction in which user is facing. Orientation of user and/or direction in which user is facing may be determined, as a non-limiting example, using navigational facilities, a compass, and/or an IMU as described above; for instance, a user's steps may be tracked to indicate a direction in which the user is walking, and/or turns the user takes may be detected, such that portable computing device can determine a likely direction in which user is facing. Where at least a first transmitter 112 is a passive or near-field transmitter, user orientation may be determined by assuming user is facing transmitter 112 initially, and potentially by tracking user motions thereafter using an IMU or navigational facility. Orientation may be determined using signal triangulation such as triangulation of beacon signals. Orientation may be determined by instructing the user to face a certain way, which may be done by reference to user's current position and/or by reference to an object having a known position. The above methods may be combined in any suitable way; for instance and without limitation, presentation may include determining a user's current orientation and then presenting objects in the user's "field of vision" starting with nearby objects and progressing to more distant objects.

Still referring to FIG. 3, description may be presented to user according to a standardized format, in which objects' positions and orientations are presented to the user in terms of shapes describing architectural features or other large or regular elements of a surrounding area. For instance, shape of or other details concerning an object may be described in a sequence of statements indicating shapes making up the overall object, which may be presented in a standardized order; as a non-limiting example, a description of an object may start with a of the object base, which may include without limitation shapes that are round, square, triangular and/or irregular shapes, which may be presented by analogy to objects likely to be familiar to a user, such as without limitation placing the fingers of a hand down on a table and lifting the forefinger to describe a form of an abstract sculpture. Continuing the above illustrative example, a description may next describe an orientation of an object. A base rectangle, for instance, may be described as set at a 45 degree angle as a user faces it; orientation may be described by extending an analogy as described above, such as, in the above example, informing the user that a portion of a structure analogized as a thumb in the example above is on the far side of the object. Continuing the above example, a description may work its way up the object describing the basic mass of the object and then each side, in terms of shapes and/or lengths, either of which may be described by reference to analogies as described above; the description may end with the top or terminal portions of an object, such as the top being a point, dome flat round surface. Object shapes may alternatively or additionally be termed as "views" of an item from various locations, such as without limitation views from "here" (description of item from this location), "best" (location to get the best view), above, behind, left, and/or right views. Object shapes may alternatively or additionally be described in terms of parts of an object and/or space, including without limitation ceiling (shape, color, artwork, lighting), floor (surfaces, items on the floor, and/or walls (color, texture, material, artwork—per wall.)

Continuing to refer to FIG. 3, a standardized descriptive format may include one or more standardized groupings of descriptive objects. For instance, tabs at the bottom of an display screen may always have the same headings to describe a first category of space, such as, without limitation "Here," "Nearby," "Spaces" (e.g., "In this building on this level"—Restaurants, Shops, Exhibits, Check Out locations, and the like), "Levels" (e.g., how to get to elevators, ramps, stairs, escalators, and the like), and/or "Exits" (such as closest, main entrance, parking, public transportation, or the like). As a further example tabs may have a different set of standardized headings for a second category of space, such as, without limitation: "Item" (e.g. description of a painting, sculpture, book, room, space, mountain, waterfall, or the like), "Creator" (e.g. information about the artist, sculptor, author, architect, or the like), "History" (such as information about how and when created and edited or enhanced), "Culture" (e.g. information about time of creation of the item), "Similar" (e.g., other works of the creator, similar items such as waterfalls), and "Exits." As a further non-limiting example, standardized tabs to describe an object in the field of medicine may include "Product" (e.g., product name), "Purpose" (e.g. blood pressure control, headache, etc.), "Dosage" (e.g. for infants, children, adults), "Side Effects" (e.g. nausea, stomach aches, cancer), "Warnings" (e.g. do not drive or use with alcohol), and "Ingredients."

In an embodiment, and still referring to FIG. 3, portable computing device 104 may receive a user entry describing a location of at least a feature within the spatial bounding constraint and modify the local area description as a function of the user entry. For instance, user may indicate that a movable object is in a different location than the one in the local area description. User may enter the location using a wizard or other tool that, for instance, traverses a virtual representation of an area within spatial bounding constraint and presents a user with an ability to indicate a current location of an object; similarly, a user may be provided with a "face" or other recognizable feature of an object and indicate in which direction that feature (or, for instance, a line normal to that feature) is facing. Where user is sighted, user may be presented with a virtual map in visual form where user may drag and drop a visual representation of a movable object to a current location in the visual map using, e.g., a mouse, locator device, touch screen, or the like. User entry may include optical capture using a camera, such as a mobile phone camera, or the like; shapes detected in camera may be geometrically matched to shapes in a virtual map, to determine where an object may have moved. User added information may be supplied by any suitable means that may occur to a person skilled in the art upon reviewing the entirety of this disclosure, including without limitation typing a feature name or type typing a description of where it is and how it is oriented and any distinguishing features.

Continuing to refer to FIG. 3, portable computing device 104 may modify regional descriptive data as a function of the user entry. Portable computing device 104 may transmit the modified regional description data to the spatial information data structure 116. A remote device 120 operating spatial information data structure 116 may modify and/or update information in spatial information data structure 116 to reflect user entered data. Remote device 120 and/or portable computing device 104 may further track such user entries to generate statistical or other calculations for predicting positions of movable objects and/or determining circumstantial data as described above. In an embodiment, where a user of portable computing device 104 is an emergency worker and/or responder or the like, safety data may be provided to user arriving in and/or responding to emergencies within an area overlapping spatial boundary constraint. Additional information may be provided to an emergency worker, including a location of a source of an emergency, such as an active shooter, an explosive device, a bomb, or the like. Additional information may include a location of a person affected by the emergency, such as a shooting, heart attack, choking, and/or stroke victim.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
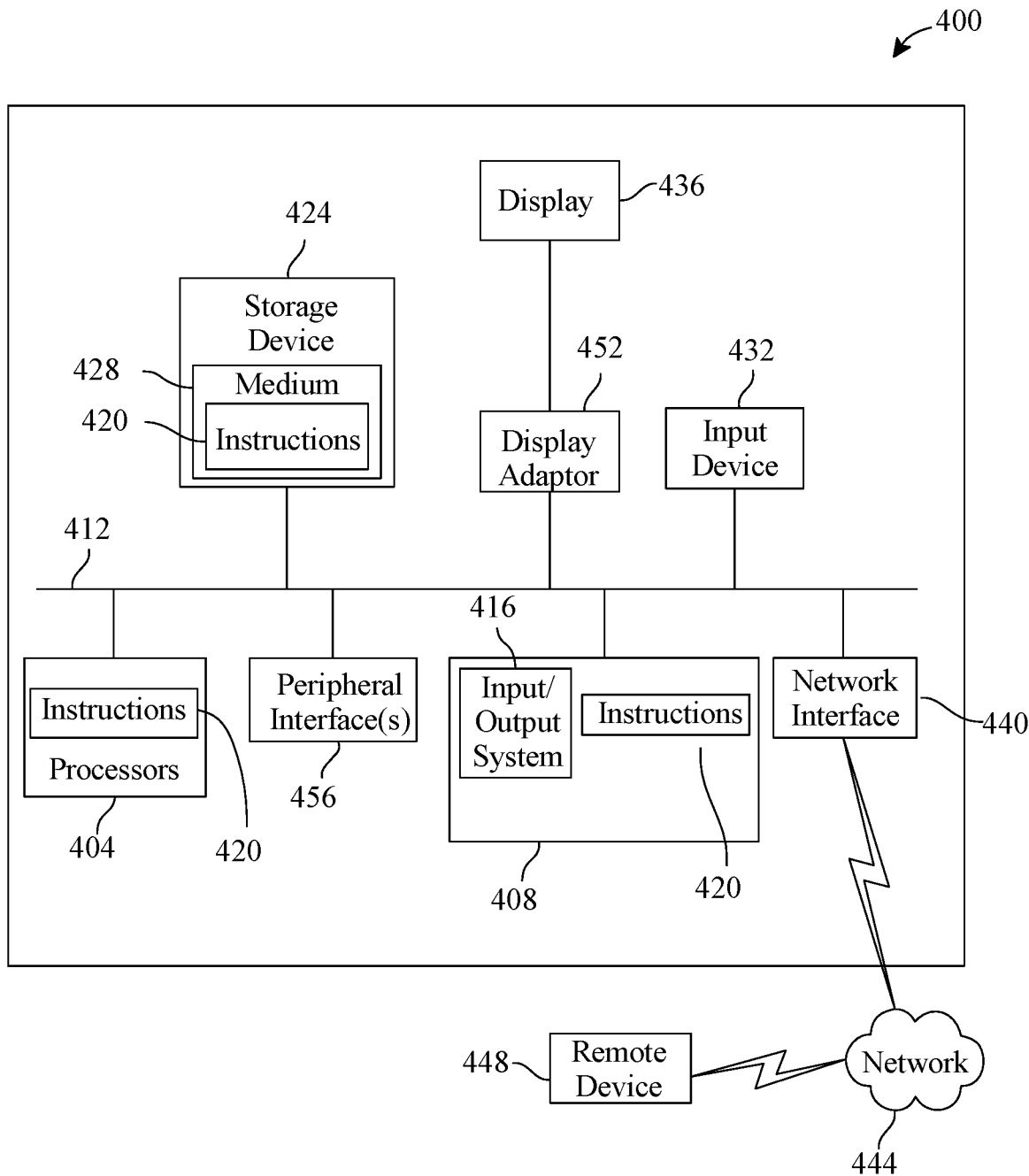
FIG. 4 is a block diagram of a computing system that can be used to implement any one or more of the embodiments disclosed herein and any one or more portions thereof.

FIG. 4 shows a diagrammatic representation of one embodiment of a computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Memory 408 may include various components (e.g., machine-readable media) including, but not limited to, a random-access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, a gesture capturing device, a bump pad, a tactile braille input device and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for wireless acquisition and presentation of local spatial information, the system comprising a portable computing device coupled to a wireless receiver, the portable computing device configured to:
   receive an identifier from at least a first transmitter, wherein the at least a first transmitter is within a root location and proximate to the portable computing device;
   establish a spatial bounding constraint relative to the root location as a function of the identifier;
   retrieve regional descriptive data from a spatial information data structure as a function of the identifier, wherein the regional descriptive data describes information within the spatial bounding constraint;
   retrieve a placement schedule as a function of the regional descriptive data;
   generate a prediction of a current location of at least one movable object as a function of the placement schedule;
   receive an element of circumstantial data;
   receive an object-density function of the spatial bounding constraint, the object-density function configured to vary the degree to which objects are described based on one or more measures of importance of objects;
   modifying the object-density function based on one or more measures of importance of objects to a user;
   generate a local area description as a function of the regional descriptive data, the spatial bounding constraint including the object-density function, the prediction, and an element of circumstantial data; and
   present the local area description to a user of the portable computing device.

2. A method of wireless acquisition and presentation of local spatial information the method comprising:
- receiving, by a portable computing device coupled to a wireless receiver, an identifier from at least a first transmitter, wherein the at least a first transmitter is within a root location and proximate to the portable computing device;
- establishing, by the portable computing device, a spatial bounding constraint relative to the root location as a function of the identifier;
- retrieving, by the portable computing device, regional descriptive data from a spatial information data structure as a function of the identifier, wherein the regional descriptive data describes information within the spatial bounding constraint;
- retrieving, by the portable device, a placement schedule as a function of the regional descriptive data;
- generating, by the portable device, a prediction of a current location of at least one movable object as a function of the placement schedule;
- receiving, by the portable device, an object-density function of the spatial bounding constraint, the object-density function configured to vary the degree to which objects are described based on one or more measures of importance of objects;
- modifying, by the portable device, the object-density function based on one or more measures of importance of object to a user;
- generating, by the portable computing device, a local area description as a function of the regional descriptive data, the spatial bounding constraint including the object-density function, the prediction, and an element of circumstantial data; and
- presenting, by the portable computing device, the local area description to a user of the portable computing device.

3. The method of claim 2, wherein establishing the spatial bounding constraint further comprises establishing the spatial bounding constraint as a function of the circumstantial data.

4. The method of claim 2, wherein retrieving regional descriptive data further comprises retrieving regional descriptive data as a function of the circumstantial data.

5. The method of claim 2, wherein the circumstantial data further comprises data describing history of user interactions with the system.

6. The method of claim 2, wherein the circumstantial data further comprises a user orientation.

7. The method of claim 2, wherein the circumstantial data further comprises a recent direction of user travel.

8. The method of claim 2, wherein the circumstantial data further comprises a current occupancy within the spatial bounding constraint.

9. The method of claim 2, wherein the circumstantial data further comprises a role-based association with the spatial bounding constraint.

10. The method of claim 2, wherein the regional descriptive data further comprises safety data.

11. The method of claim 2, wherein the regional descriptive data further comprises personal data of a person within the spatial bounding constraint.

12. The method of claim 11, wherein the personal data includes organizational role data.

13. The method of claim 11, wherein the personal data includes credential data.

14. The method of claim 11, wherein the personal data includes medical history data.

15. The method of claim 2, wherein regional descriptive data include construction history of a structure overlapping spatial bounding constraint.

16. The method of claim 2, wherein the regional descriptive data include a function of a space overlapping spatial bounding constraint.

17. The method of claim 2, wherein the regional descriptive data include a description of equipment located within spatial bounding constraint.

18. The method of claim 2, wherein the regional descriptive data include a status of equipment located within spatial bounding constraint.

19. The method of claim 2, wherein regional descriptive data includes historical data relating to an object within spatial bounding constraint.

20. The method of claim 2, wherein generating the local area description further comprises detecting an emergency and generating the local area description as a function of the emergency.

* * * * *